United States Patent [19]

Fisherman et al.

[11] Patent Number: 5,586,301
[45] Date of Patent: Dec. 17, 1996

[54] PERSONAL COMPUTER HARD DISK PROTECTION SYSTEM

[75] Inventors: Igor Fisherman, Philadelphia, Pa.; Oleg V. Kouznetsov, Budapest, Hungary; Sergey P. Pavlishin, Budapest, Hungary; Alexander N. Shatilov, Budapest, Hungary

[73] Assignee: YBM Technologies, Inc., Newton, Pa.

[21] Appl. No.: 336,450

[22] Filed: Nov. 9, 1994

[51] Int. Cl.⁶ .................................................. G06F 13/00
[52] U.S. Cl. ..................... 395/479; 395/186; 395/490; 380/4; 364/DIG. 1
[58] Field of Search ................... 380/3, 4; 395/427, 395/186, 479, 490

[56] References Cited

U.S. PATENT DOCUMENTS

| | | |
|---|---|---|
| 4,757,533 | 7/1988 | Allen et al. . |
| 4,975,950 | 12/1990 | Lentz .......................... 380/4 |
| 5,144,659 | 9/1992 | Jones .......................... 380/4 |
| 5,289,540 | 2/1994 | Jones .......................... 380/4 |
| 5,421,006 | 5/1995 | Jablon et al. ............... 395/575 |

FOREIGN PATENT DOCUMENTS

| | | |
|---|---|---|
| 0268138A2 | 5/1988 | European Pat. Off. . |
| 0407060A2 | 1/1991 | European Pat. Off. . |
| 0458718A2 | 11/1991 | European Pat. Off. . |
| 4208777 | 3/1992 | Germany ............. G06F 12/16 |
| 4034444A1 | 5/1992 | Germany . |
| 2222899 | 3/1990 | United Kingdom ......... G06F 12/14 |
| 2242295A | 9/1991 | United Kingdom . |
| 2248324A | 4/1992 | United Kingdom . |
| WO90/12464 | 10/1990 | WIPO ........................ H04L 9/00 |

OTHER PUBLICATIONS

MicroSoft Press MS–DOS Programmer's Reference–Version 6 Chapter 3 pp. 19–21, 31–34.
Terry Dettmann Revised by Allen L. Wyatt DOS Programmer's Reference–4th Ed. pp. 44–51, 228, 229.

*Primary Examiner*—Tod R. Swann
*Assistant Examiner*—Frank J. Asta
*Attorney, Agent, or Firm*—Caesar, Rivise, Bernstein, Cohen & Pokotilow, Ltd.

[57] ABSTRACT

The personal computer hard disk protection system is designed to protect data stored on computer hard disks while permitting multiple user operation. The personal computer hard disk protection system prevents unauthorized access to the hard-disk controller by software applications, and permits safe servicing of requests which use the BIOS. The basis for the personal computer hard disk protection system functions is the dynamic transformation of the file system to the configuration of the current user. The system is based on a hardware device called the protection-program support module and a set of protection programs, most of which is stored in the protection-program support module. The protection program support module is an external board and is connected to the computer system bus.

29 Claims, 27 Drawing Sheets

PERSONAL COMPUTER HARD DISK PROTECTION SYSTEM

FIELD OF THE INVENTION

The invention pertains to apparatus for protecting data stored on a computer from inadvertent or intentional distortion. In particular, this invention concerns a hard disk protection system that protects data stored on a personal computer system that is accessible to a plurality of users.

BACKGROUND OF THE INVENTION

The most general and progressive approach to shared information processing using personal computers is to join the computers into a local area network (LAN). LAN's facilitate data gathering and allow more efficient use of personal computer memory. However, these networks also provide favorable conditions for the rapid spread of programs known as computer viruses, and thus increase the risk of massive distortion of the information on the personal computer hard disks. LAN's are particularly vulnerable to computer viruses which distort information for the purpose of causing economic loss to the information owners. Because of the enormous losses caused by existing viruses and the continual introduction of new viruses, personal computers have to be equipped with protection subsystems which prevent the deliberate distortion of information. However, despite the wide variety of available file-protection subsystems, computer crime statistics indicate that computer viruses are as dangerous as ever and are still capable of causing enormous losses to personal computer users. Users of personal computers connected in LAN's have a much higher risk than users of isolated computers. Therefore, there is still an urgent need to improve the methods and means of protecting computer files, especially for LAN-linked computers.

An analysis of current methods and means of protecting computer files shows that the most reliable protection is provided by subsystems which use dedicated hardware to support the protection programs. One particularly effective way of protecting computer files is to use specialized processors acting as a connecting link between the central processor and the file storage device. A typical example of a highly reliable protection subsystem is the computer file protection subsystem developed and patented by Empirical Research System, Inc. (Computer File Protection System: International-Publication No. WO 90/13084, C06F 12/14. Application submitted Apr. 19, 1989, published Nov. 1, 1990). This subsystem can be accessed by the operating system for modifications only during installation. The hardware for this subsystem includes programmable external memory and a programmable external control device. The programmable control device is based on a digital microprocessor and is installed as an intermediate link between the central processor and the file storage device. The programmable control device monitors the control logic signals, the address signals, and the data signals formed by the central processor. An auxiliary memory stores file-access criteria established by the supervisor. The control device checks for file access authorization and prevents access attempts that do not meet the established criteria. The control device also reads the signatures of all the protected files and compares the signatures of the loaded files with the reference signatures. To store the file signatures, the controller creates a protected memory region that is inaccessible to the operating system. In the event of any deviation from the established protection criteria, the protection subsystem prohibits the use of the computer.

An obvious disadvantage of the above-described subsystem is that any user can view the disk directories. This circumstance permits complete viewing of the disk directories, and encourages unsanctioned activity by users wishing to study and distort the data of other users. Another obvious disadvantage of the above-described subsystem is that the hardware serving as the intermediate link between the central processor and the file storage device must be located on a board which connects to the file storage device or on the boards of other devices. As a result, this protection subsystem requires additional hardware and does not provide the most efficient use of the existing hardware.

OBJECTS OF THE INVENTION

Accordingly, it is the general object of this invention to provide apparatus which address the aforementioned needs.

It is another object of this invention to eliminate the need to monitor requests at the operating system level and at the modular device driver level of the personal computer.

It is yet another object of this invention to require less complicated hardware.

SUMMARY OF THE INVENTION

These and other objects of the instant invention are achieved by providing a hard disk protection system for protecting data stored on a hard disk of a personal computer that is available to a plurality of users. The hard disk has logical disk structure including an operating system having logical drives. The system comprises protection programs that interpret the logical drives as a fixed set of zones on the hard disk for a particular user and wherein each of the fixed set of zones have respective access rules. The system also includes a hardware module responsive to the protection programs, that either allows or denies access to the hard disk based on the access rules. The hardware module has a first memory that is inaccessible to the central processing unit and a second memory that is accessible to the central processing unit.

DESCRIPTION OF THE DRAWINGS

Other objects and many of the attendant advantages of this invention will be readily appreciated as the same becomes better understood by reference to the following detailed description when considered in connection with the accompanying drawings wherein the structure and functional organization of the data protection and sharing system are illustrated in the following drawings.

DESCRIPTION OF THE INVENTION

Figure 1:
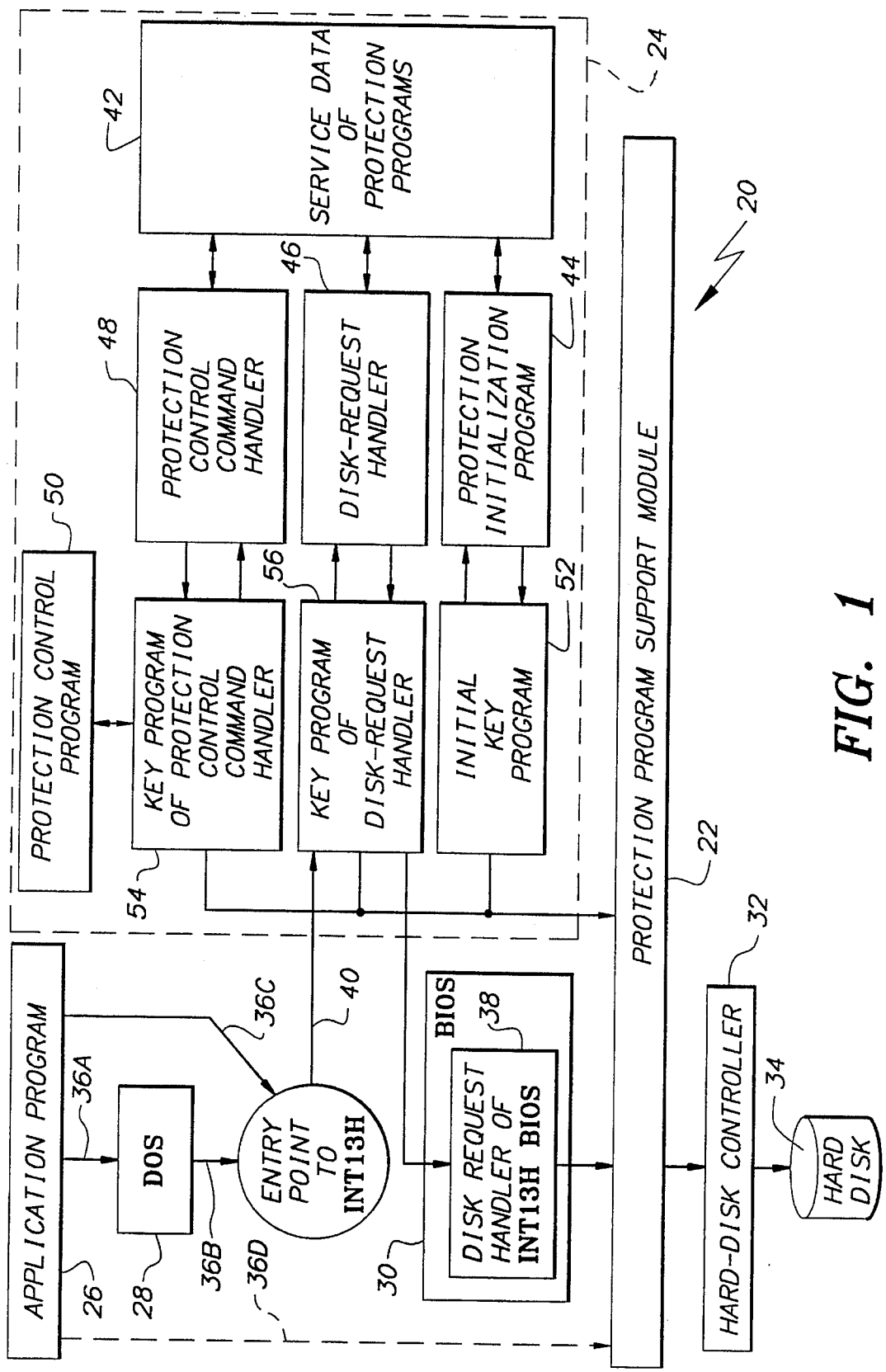
FIG. 1 is a structural block diagram of the hard disk protection system installed in a computer.

Referring now in detail to the various figures of the drawing wherein like reference characters refer to like parts, there is shown at 20 in FIG. 1, a personal computer hard disk protection system (HDPS) that comprises a hardware module 22, known as the protection-program support module (PPSM), and protection software 24. At this juncture, it is necessary to point out that the PPSM 22 is subject matter of U.S. application Ser. No. 08/269,591 (now U.S. Pat. No. 5,483,649), assigned to the same assignee as this invention and whose disclosure is incorporated by reference herein.

As shown in FIG. 1, a conventional personal computer system basically comprises application software 26, an operating system 28 (e.g., DOS or WINDOWS, etc.) and a basic input/output system (BIOS) 30. Typically, access to the hard disk controller 32 (and, thereby, the hard disk 34 itself) from the application program 26 is via the entry point 34 to the standard BIOS handler known as INT 13H BIOS, as shown by paths 36A–36C. In some cases, access from the application program 26 to the hard disk controller 32 is direct, as shown by path 36D.

However, with the HDPS 20 coupled to the personal computer system, as will be discussed in detail later, the HDPS 20 prevents direct access to the hard-disk controller 34 by the application program 26 (as indicated by the hatched access path line 36D) and ensures security for disk access using the BIOS disk-request handler 38. In order to verify and ensure the security of disk requests using INT 13H BIOS, the HDPS 20 uses a link 40 with the BIOS input. This link 40 is established by modifying the interrupt vector table to replace the address of the original handler of INT 13H BIOS with the address of the key program of the disk-request handler, which will also be discussed later.

The protection software 24 comprises a set of protection programs which create service data 42 for use in the HDPS 20 processes. These service data 42 of the protection programs are a separate information component. The set of protection programs includes a protection initialization program 44, a disk-request handler 46, a control-command handler 48, a protection control program 50, and a set of key programs, which includes the initial key program 52, the command-handler key program 54, and the request-handler key program 56.

The set of protection programs is stored on the hard disk 34 and in the PPSM 22. In particular, the protection control program 50 is stored as an ordinary file on the hard disk 34. The other protection programs are stored in the PPSM 22.

Figure 2:
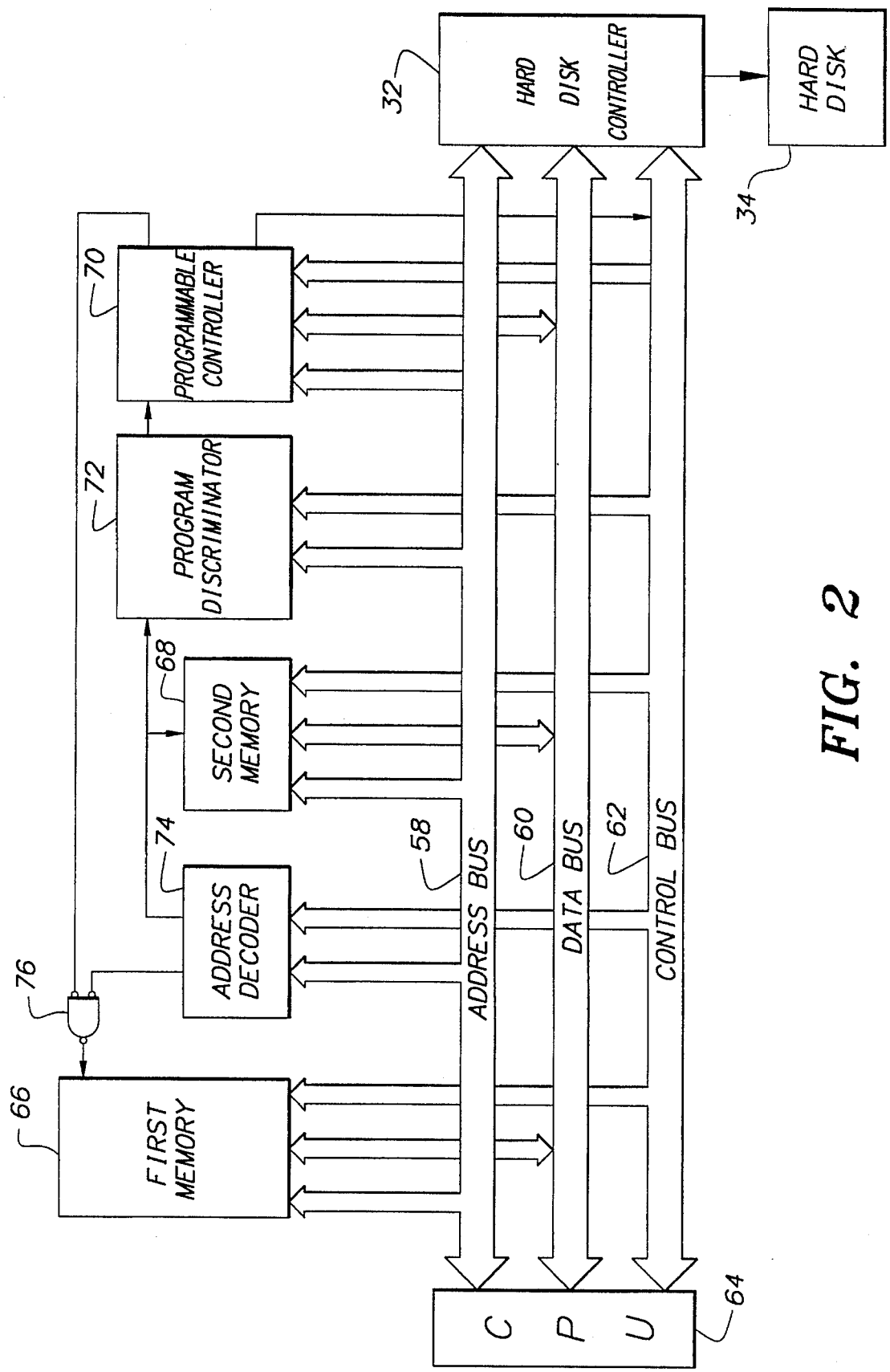
FIG. 2 is a structural block diagram of the protection program support module.

The PPSM 22 provides hidden storage of the protection programs and establishes a logical relationship between the ability to access the hard disk 34 and the execution phase of the protection programs. As shown in FIG. 2, the PPSM 22 comprises an external board connected to the system bus (i.e., the address bus 58, data bus 60 and control bus 62) of the personal computer, and has two operating modes: active and passive. In the active mode, the PPSM 22 hides the protection programs from the central processing unit 64 (CPU) and prevents the CPU 64 from accessing the hard disk 34. In the passive mode, the PPSM 22 permits the protection programs to be read, and does not affect the access to the hard disk 34 by the CPU 64. In order to obtain free access to the hard disk 34, the CPU 64 must switch the PPSM 22 to the passive mode, and to do this, the CPU 64 must use one of the key programs. The reason for the use of the key programs is that the PPSM 22 determines the type of program which is attempting to change the status, and the PPSM 22 allows a change in its status only if flags are present indicating that the key program is active. After the PPSM 22 is switched to the passive mode, the key program transfers control to the protection programs stored in the PPSM 22.

The PPSM 22 comprises a first memory 66, a second memory 68, a programmable controller 70, and a program discriminator 72. The first memory 66 stores the protection programs and can be made inaccessible to the CPU 64. The second memory 68, which is always accessible to the CPU 64, stores the set of key programs which are used to change the status of the PPSM 22. The programmable controller 70 prevents access to the hard disk 34 and forbids access to the first memory 66. The CPU 64 can program the mode of the programmable controller 70 only when a signal is present indicating that one of the key programs is active. The program discriminator 72 determines the type of program acting on the programmable controller 70 and establishes a logical relationship between the ability to switch the PPSM 22 mode and the type of program acting on the programmable controller 70. If flags are present indicating that one of the key programs is active, the program discriminator 72 allows the entry of information into the programmable controller 70. Otherwise, the program discriminator 72 does not permit the entry of information in the programmable controller 70. The PPSM 22 also includes an address decoder 74 and an AND gate 76. The details of the operation of the PPSM 22 are set forth in U.S. application Ser. No. 08/269,591 (now U.S. Pat. No. 5,483,649).

The basis for the protection of data stored on the hard disk 34 is the dynamic conversion of the file system to the configuration of the current user. The file system is converted by masking the clusters occupied by data that are not to be accessed by the current user and then representing the free disk space as being continuous. It should be noted at this juncture that the hard disk 34 comprises standard MS-DOS logical disk structure, i.e., the disk space is divided into a boot sector, a first copy of a file allocation table (FAT1), a second copy of the file allocation table (FAT2) and a root directory, with the remainder of the disk space allocated for file storage. Conventional logical disk structure is discussed in the "DOS Programmer Reference 4th Edition" by Terry Dettmann (copyright 1993) and in the "MS-DOS Programmer's Reference Manual" by Microsoft Corporation (copyright 1993), both of which forms are incorporated by reference herein.

During the protection process, each logical drive of the MS-DOS operating system 28 is interpreted by the HDPS 20 as a fixed set of zones of the disk space, with different access rules for each zone.

The first zone called the BootZone, occupies the disk space from the sector containing the description of the logical-drive partition to the loading sector of the disk, inclusive. Access to this disk zone is permitted for reading only.

The second zone, called the FatZone, occupies the disk space from the first sector of the first copy of the logical-drive FAT to the first sector of the root directory of the disk. Access to this zone is permitted for reading and writing. Any writing operation is preceded by verification of the correctness of the proposed changes, and writing will not be permitted if an attempt is made to write incorrect data.

The third zone, called the RootZone, occupies the disk space from the first to the last sector of the disk root directory, inclusive. The operations of reading and writing are permitted for this zone. Before writing operations, the proposed changes are analyzed in order to prevent unsanctioned changes to the directory entries for the protected files and directories.

The fourth zone called the ClustZone, occupies the disk space from the first sector of the first cluster of the disk to the beginning of the next zone, which is described below. Access to this zone is permitted for reading and writing. Before writing operations, the proposed changes are analyzed in order to prevent unsanctioned changes in the protected files and directories.

The fifth zone called the HiddenZone, occupies disk space at the end of the logical drive and is used to store HDPS data structures which are used for the operation of the system. No programs are permitted access to this zone for reading or writing. The contents of the disk loading sector are changed so that the disk space occupied by this zone is excluded from the disk space accessible to the operating system.

The process of file-system conversion begins after the computer is started or reset. The PPSM 22 goes into the passive mode, permitting access to the EPROM and the RAM of first memory 66 of the PPSM 22 and access to the hard-disk ports.

During the BIOS ROM-Scan procedure, the protection initialization program 44 receives control via initial key program 52. The protection initialization program 44 identifies the current user with the aid of the list of user names and passwords (USER_LIST). The user is allowed to operate the system if the name and password entered are on the USER_LIST. If the user is identified as on the list, the protection initialization program 44 changes two sets of data structure (to be described later) of the HDPS data on the hard disk 34, setting the HDPS 20 to serve the current user.

Figure 3:
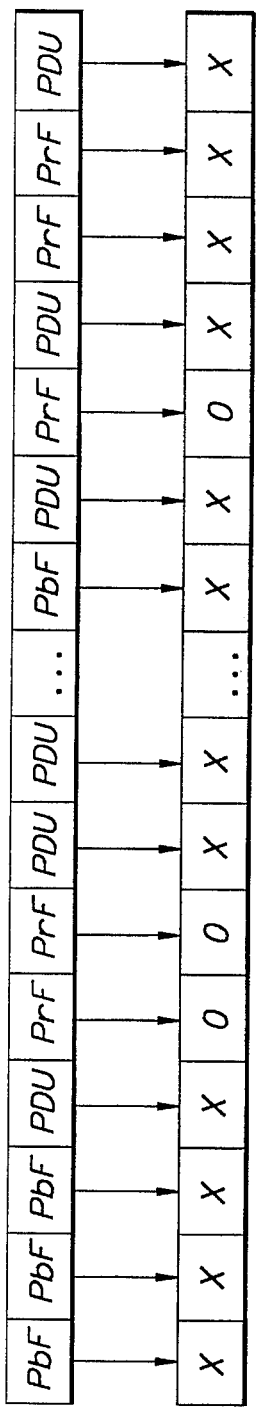
FIG. 3 shows the scheme for forming virtual disk space.

After the data structure sets of the HDPS data on the hard disk 34 have been changed, the protection initialization program 44 generates protection-program service data into the RAM of the first memory 66 of the PPSM 22. The principal structure that is generated is the map of access rights (ACCESS_MAP). This map is generated on the basis of information about the attributes and status of the files and directories as obtained from the list of directory and file descriptors (FILEDEF_LIST). The logical-drive parameters of the operating system 28 are changed in accordance with the access map. This change, together with the access map, makes it possible to organize a virtual continuous disk space for the operating system 28. The mechanism for forming a virtual continuous disk space is shown in FIG. 3. The virtual disk space is formed by eliminating clusters which do not belong to the current user.

In particular, FIG. 3 shows the scheme for forming virtual disk space. The virtual disk space is formed by eliminating clusters which do not belong to the current user. PbF is a cluster belonging to a public file, PDU is an unallocated (free) cluster and PrF is a cluster belonging to the private file of another (not the current user). The "X" indicates a cluster allocated to a virtual disk space while the "O" indicates a cluster that is not allocated to virtual disk space, i.e., not accessible to the current user. When the virtual disk space is formed from the real disk space, the file clusters not belonging to the current user are eliminated. The clusters included in the virtual disk space are renumbered sequentially in order to form the continuous disk space accessible to the current user.

After the protection-program service data 42 have been generated, the original address of the INT 13H BIOS disk-request handler 46 in the interrupt vector table is replaced by the address of the key program 56 of the HDPS disk-request handler.

After the interrupt vector has been changed, control is returned to the POST through the initial key program 52, which executes and switches the PPSM 22 to the active mode, thereby forbidding access to the EPROM and RAM of the first memory 66 of the PPSM 22, as well as access to the hard-disk ports. After control is returned to POST, the operating system 28 is loaded, and all disk requests are executed under the supervision of the HDPS 20.

When a disk request is received, control is transferred to the key program 56 of the HDPS disk-request handler 46. Execution of the key program 56 of the HDPS disk-request handler 46 causes the PPSM 22 to switch to the passive mode. After the PPSM 22 is switched to the passive mode, the key program 56 calls the HDPS disk-request handler 46.

The HDPS disk-request handler 46 receives a set of parameters of the requested disk operation. This set includes: the operation code, the numbers of the disk, track, surface, and sector; the quantity of sectors for which the operation is requested; and, in the case of reading and writing operations, the address of the exchange buffer.

If the requested operation does not involve reading or altering information on the disk 34, then the original disk-request handler of INT 13H BIOS is called.

If the requested operation involves reading or altering information on the disk 34, then the validity of the request is analyzed, and if necessary the request parameters are converted.

The logical-drive number and the type of disk space zone for which the operation is requested are determined based on the incoming request parameters. The disk space partitioning table DISK_SPACE_TABLE is used to determine the type of disk space zone.

If an operation is requested for the BootZone, the operation code is checked. If the requested operation involves the alteration of data, then the operation is not performed, a "Write Protect" error code is generated, and control is returned to the key program 56 of the disk-request handler 46. If the operation does not involve the alteration of data, then the original disk-request handler of INT 13H BIOS is called.

If an operation is requested for the FatZone, the operation code is checked. If the operation involves the alteration of data, the validity of the proposed changes is analyzed. The analysis is made by determining the set of modified elements in the disk space distribution table and testing the correspondence between the element number and the disk cluster for each element. The validity of a change of an element of the disk space distribution table is determined based on the access map and the cluster number. If the changes are correct or if a reading operation is requested, then the original disk-request handler of INT 13H BIOS is called. If the changes are not correct, then the operation is not performed, a "Write Protect" error code is generated, and control is returned to the key program 56 of the disk-request handler 46.

If an operation is requested for the RootZone, the operation code is checked. If the operation involves the alteration of data, the validity of the proposed changes is analyzed. The analysis determines the set of directory entries to be modified. If the ATTR_READONLY attribute of the directory entry to be modified is not equal to 1 and if the proposed changes are correct, the new value of the directory entry is displayed in the corresponding directory-entry descriptor of the list of directory and file descriptors (FILEDEF_LIST). A new descriptor for the new directory entry is created in FILEDEF_LIST. If the new directory entry has new information on the size or location of the file or directory, then the corresponding changes are made in the main file allocation table (MAINFAT) and in the cluster affiliation table (CLUSTER_TABLE). If the information on the file attributes is altered in the modified directory entry, the corresponding changes are entered into the map of access rights (ACCESS_MAP). Modification of directory entries with an ATTR_READONLY attribute equal to 1 is not permitted. If the proposed changes are correct or if a read operation is requested, then the original disk-request handler of INT 13H BIOS is called. If the changes are not correct, then the operation is not performed, a "Write Protect" error code is generated, and control is returned to the key program 56 of the HDPS disk-request handler 46.

Figure 4:
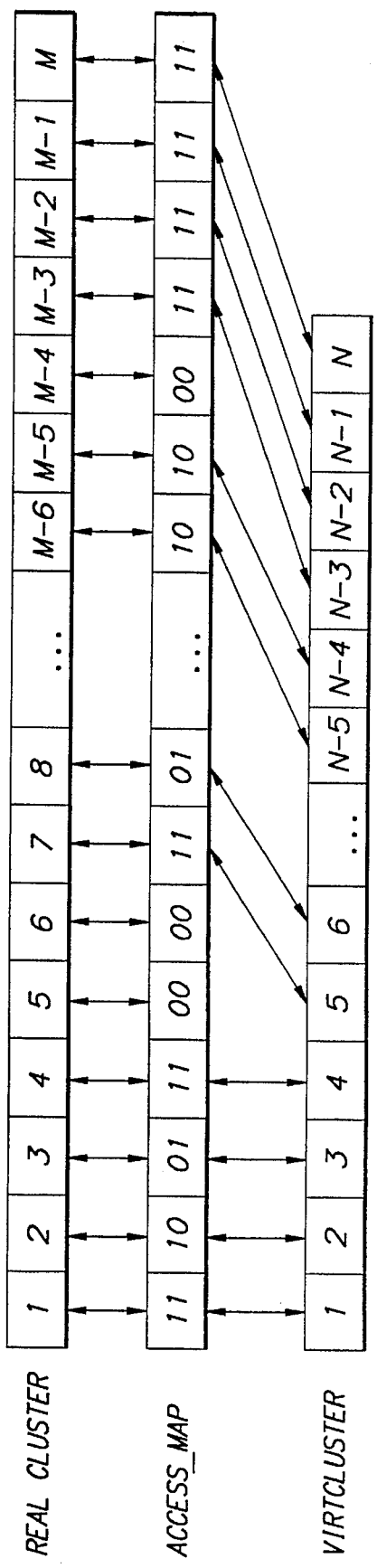
FIG. 4 shows the scheme for converting a virtual cluster number into a real cluster number.

If an operation is requested for the ClustZone, then the pertinent cluster number is determined on the basis of the request parameters. The calculated cluster number is virtual. The virtual cluster number is converted into the real cluster number on the basis of the information contained in ACCESS MAP. The procedure for converting the virtual cluster number into the true number is shown in FIG. 4. The virtual cluster number is converted into the real cluster number by adding to the virtual cluster number a value which defines the number of clusters which do not belong to the current user and which are located between the cluster specified by the virtual number and the beginning of the ClustZone. If the requested operation involves the alteration of data on the disk, then a check is made to determine if the operation is authorized. This check is based on information contained in ACCESS_MAP. The authority for the operation of altering the contents of the cluster is determined. If the requested operation does not involve the alteration of data on the disk or if the proposed changes do not contradict the access rights to the cluster with the true number, then the new values of the request are calculated based on the real cluster number, and the original disk-request handler of INT 13H BIOS is called. If the requested operation contradicts the access rights, then the operation is not performed, a "Write Protect" error code is generated, and control is returned to the key program 56 of the disk-request handler 46.

If an operation is requested for the HiddenZone, the operation code is checked. If the operation involves the alteration of data, then the operation is not performed a "Write Protect" error code is generated, and control is returned to the key program 56 of the disk-request handler 46. If the requested operation is a data reading operation, the operation is not performed, a code for the successful completion of the operation is generated, and control is returned to the key program of the disk-request handler.

After control is returned to the disk-request handler from the original disk-request handler or INT 13H BIOS, control is returned to the key program 56 of the disk-request handler 46. The key program 56 returns control to the program which called it. When control is returned by the key program, the PPSM 22 is switched to the active operating mode, in which access is forbidden to the EPROM and RAM of first memory 66 of the PPSM 22, as well as to the hard disk ports.

The service data 42, used by the HDPS, comprises two sets of data structures which differ in storage method. The first data set is unique for each logical drive. It is stored in the HiddenZone of the disk 34 and if necessary can be read to the RAM of the first memory 66. The second data set is stored in the EPROM of first memory 66. The first set contains the following data structures:

The list of directory and file descriptors (FILEDEF_LIST), which contains information on the directory entries of all the files and directories of the logical drive of every user. The element fields FILEDEF_FIELD of this list are as follows:

DirEntry is the directory entry created by the operating system 28, except that the field deStartCluster contains the virtual cluster number for the current user and the real cluster number for the other users;

DirRef is the descriptor number of the directory entry for the directory which contains the given directory entry; for a directory entry in the root directory, DirRef= 0FFFFH;

UserNmb is the user number of the file or directory identified by the DirEntry;

Status is the file status, which can be either PRIVATE, for personal files, or PUBLIC, for open files (in the latter case, the UserNmb field is not used);

2. The map of disk access rights (ACCESS_MAP), which contains the access rights to logical-drive clusters. This map is the basis for converting the virtual cluster numbers into true numbers and vice versa. The ACCESS_FIELD element of the access rights map can have the following values:

ACCESS_FIELD-(1,1): the cluster is accessible for reading and writing;

ACCESS_FIELD=(1,0): the cluster is accessible for reading only;

ACCESS_FIELD=(0,1): the cluster belongs to the directory;

ACCESS_FIELD=(0,0): the cluster does not belong to the current user.

3. The disk space partitioning table DISK_SPACE_TABLE, which contains information on the partitioning of the logical drive into the following zones:

EndSecBoot, the number of the last BootZone sector relative to the start of the hard disk;

EndSecFat, the number of the last FatZone sector relative to the start of the hard disk;

EndSecRoot, the number of the last RootZone sector relative to the start of the hard disk;

EndSecClust, the number of the last ClustZone sector relative to the start of the hard disk;

EndSecHiden, the number of the last HiddenZone sector relative to the start of the hard disk.

4. The cluster affiliation table CLUSTER_TABLE, which determines, for each cluster of the current user, the descriptor number of the directory entry in FILEDEF_LIST. A table element (CLUSTER_FIELD) consists of one Owner field, which is the number of the directory entry in FILE-DEF_LIST for the file or directory to which the cluster belongs. Thus, the data structures of FILEDEF_LIST and CLUSTER_TABLE make it possible to determine, from the cluster number, the entire file or directory path of the owner of a given cluster. For an unallocated cluster, the value of the Owner field is 0.

5. The main file allocation table MAIN_FAT. A table element (FAT_FIELD) contains the real cluster number. This table makes it possible at the beginning of the session to construct the file allocation table (FAT) of the current user with virtual cluster numbers.

6. The list of disk control and address parameters KEY_LIST, which contains information which makes it possible to obtain access to the HDPS data structures on the disk. KEY_LIST has the following fields:

Signature, the flag indicating the presence of HDPS 20 on the disk. This field is equal to INSTALL if the HDPS 20 is installed;

AccessMapAddr the number of the initial sector of ACCESS_MAP relative to the beginning of the hard disk 34;

ClusterTableAdr, the number of the initial sector of CLUSTER_TABLE relative to the beginning of the hard disk 34;

MainFatAddr, the number of the initial sector of MAIN_FAT relative to the beginning of the hard disk 34;

FileDefAddr, the number of the initial sector of FILE-DEF_LIST relative to the beginning of the hard disk 34;

UserNmb, the user number. Before the HDPS 20 is initialized, it contains the number of the previous user. After initialization, it contains the number of the current user.

KEY_LIST is stored in the last sector of the logical drive. The RAM of the first memory 66 of the PPSM 22 always contains the DISK_SPACE_TABLE and the ACCESS_MAP for the current user.

The second data set is stored in the EPROM of the first memory 66 of the PPSM 22. This set contains only one data structure:

1. The list of user names and passwords (USER_LIST), which gives the names and passwords of the users who have access to the HDPS 20. The Name field of the USER_FIELD element contains the user's name, and the Password field contains the password. If the Password field of the element is equal to 0, then the user identified in the Name field has never accessed the HDPS 20.

When the computer is turned on or when a "Reset" signal is received, access is allowed to the EPROM and the RAM of the first memory 66 of the PPSM 22, and the POST (Power-On Self-Test) program begins to execute. During the Scan-ROM stage, this program transfers control to the protection initialization program 44, via the initial key program 52, in the PPSM EPROM.

Figure 5:
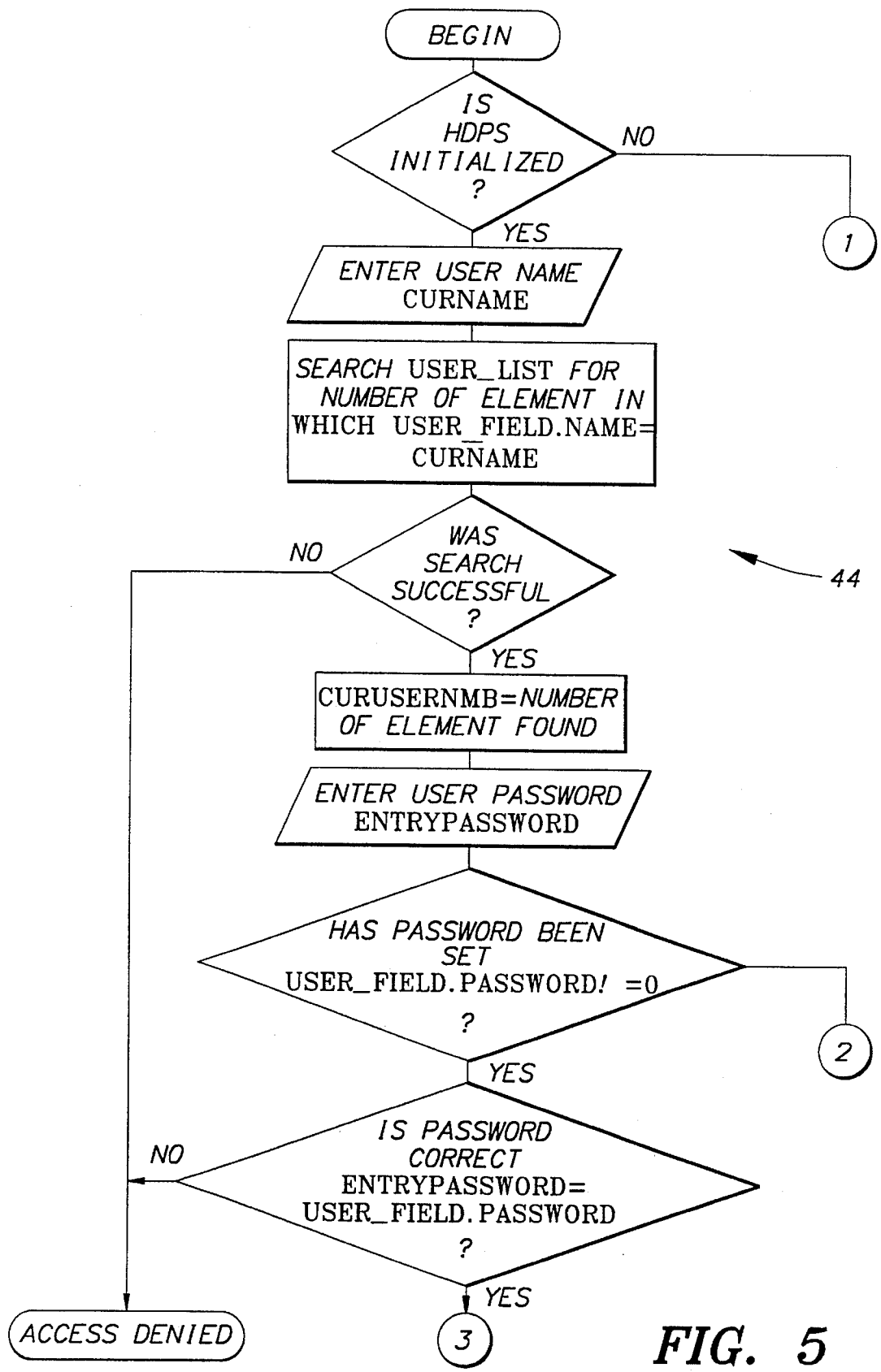
FIGS. 5–5B is a flow chart of the protection initialization program.
Figure 5A:
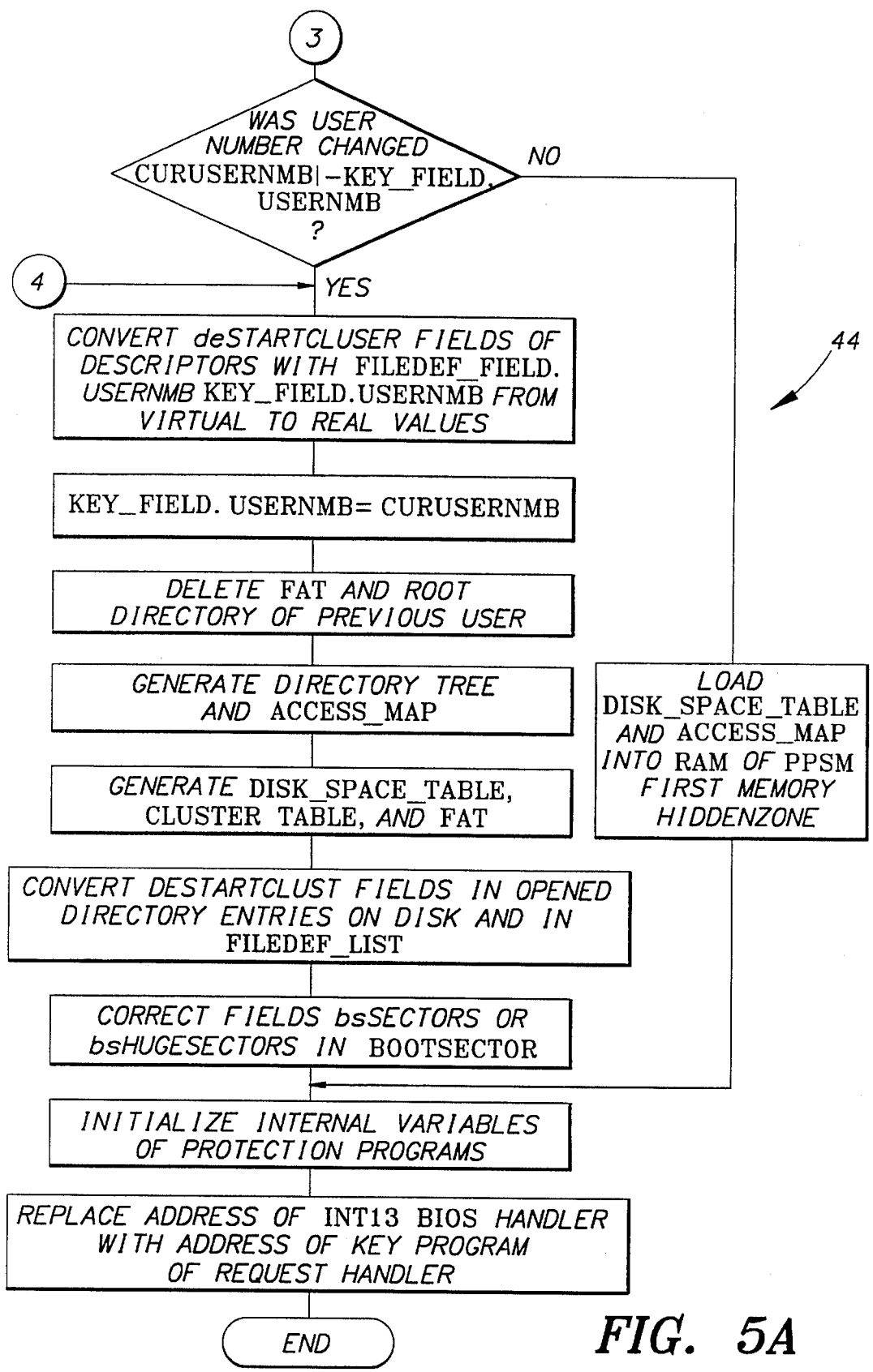
Figure 5B:
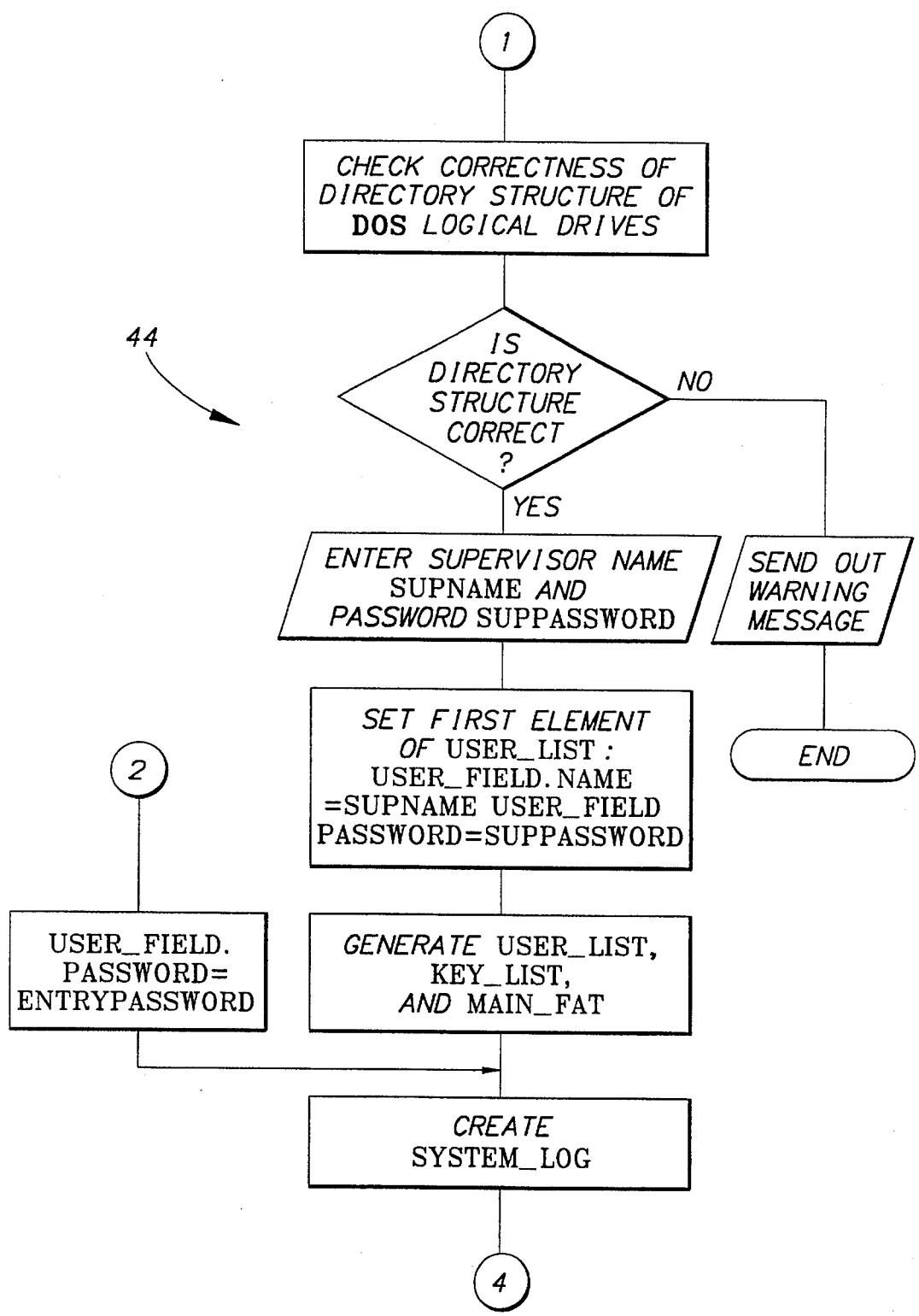

The protection initialization program 44 sets up the HDPS 20 for the work session with the current user by generating data structures and variables in the hard disk 34 and in the RAM of the first memory 66 of the PPSM 22. A flow chart of the protection initialization program 44 is shown in FIGS. 5 and 5A.

The program 44 first checks whether the HDPS 20 is installed on the hard disk 34 by looking for the KEY_FIELD signature. If the HDPS 20 has not yet been installed, the installation procedure is begun. During this procedure, the program 44 checks the correctness of the directory structure of the logical drives at the time of installation. This includes a search for "lost" clusters and cross references in the FAT and verification that the length of the files corresponds to the quantity of occupied clusters, that the directory headings are correct, and that there is sufficient free space on the hard disk 34 for the installation of the system. If any incorrect situations are found, a warning message is issued and control returns to the POST. Otherwise, the initialization program 44 asks the user to give a name SupName and password SupPassword. The system 20 should be installed by the supervisor, since the system 20 will recognize the name entered during installation as the supervisor name. The supervisor name and password are placed in the first element of the USER_LIST, which is stored in the EPROM of the first memory 66.

The next step is the formation of the data structures that require the allocation of disk space in the HiddenZone. For this purpose, a region of disk space for the HDPS 20 is created at the end of each logical drive. If there are user files/directories in this region, they are transferred to clusters accessible to the user. The size of the HiddenZone is determined based on the maximum possible size of the FILEDEF_LIST and the fixed sizes of the ACCESS_MAP, CLUSTER_TABLE, and MAIN_FAT for the given logical drive. The program 44 then reviews the entire directory tree on the disk 34 and forms the DirEntry and DirRef fields in the FILEDEF_LIST. The Status fields of all the elements are set to PUBLIC. The existing FAT is copied into the MAIN_FAT. The address fields in the KEY_LIST are filled out. The signature field is set to INSTALL, and the UserNmb field is zeroed. After the system log is created, the rest of the installation algorithm is the same as the algorithm for the case of a change of user.

If the system 20 is already installed, the user enters a name CurName, and the USER_LIST is searched for an element USER_FIELD Name which coincides with the entered name. If the entered name is not registered, the computer locks up and can be restarted only after a Reset signal is received or the power is turned off. If the entered name is in USER_LIST, the current user number CurUserNmb is assigned a value equal to the number of the element found in USER_LIST. If no password has been set for the user coming on the system 20, the user must enter a password into the system 20 for the first session after the HDPS 20 is installed. After the password is set and the system log is created, the operation continues the same as in the case of a change of user. The existing user password is compared with the entered password. If they do not match, the computer locks up. If access to the system 20 is allowed, it is determined whether this is the same user as in the previous session. If it is a different user, the values of the deStart-Cluster fields are converted from the virtual cluster numbers to the real cluster numbers in the directory and file descriptors of the previous user in FILEDEF_LIST, and the value of the CurUserNmb is assigned to KEY_FIELD.UserNmb. Then the FAT and the root directory of the previous user are cleared. The directory clusters of the previous user are considered to be unoccupied. These changes are possible because of the dynamic monitoring of all changes occurring in the directory structure when the operating system 28 is operating. Then a directory tree based on FILEDEF_LIST is opened, and DirEntry are selected only for elements with values of:

FILEDEF_FIELD.Status=PUBLIC or

Figure 6:
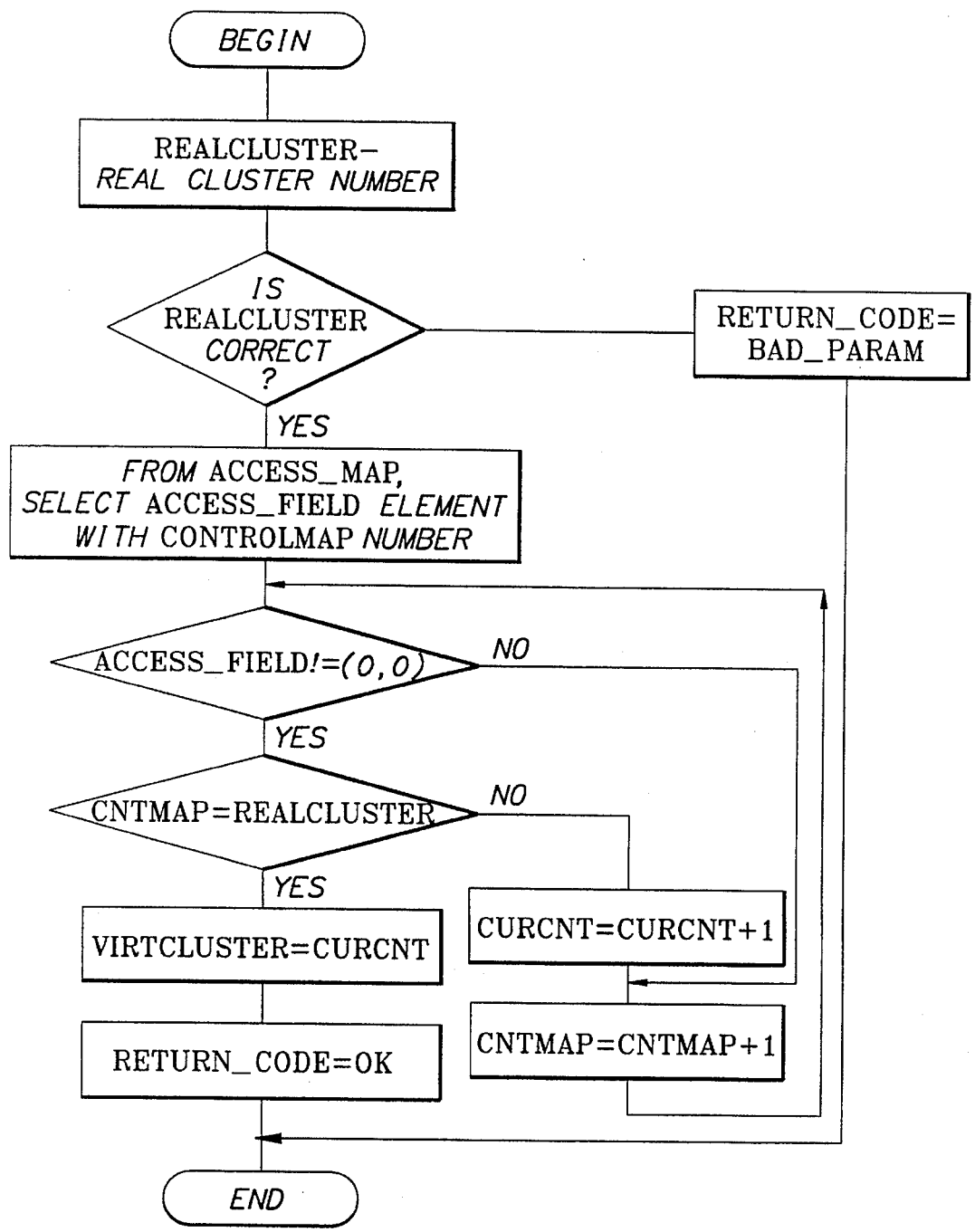
FIG. 6 is a flow chart of the program which converts a real cluster number into a virtual cluster number.

FILEDEF_FIELD.UserNmb=CurUserNmb. While the directory is being opened, the ACCESS MAP is constructed based on the deAttributes of the files and directories belonging to the current user. Clusters belonging to files with ATTR_READONLY=O and unoccupied clusters receive the access right ACCESS_FIELD=(1,1). Clusters belonging to files with ATTR_READONLY=1 receive the access right ACCESS_FIELD=(1,0). Clusters belonging to directories receive the access right ACCESS_FIELD=(0,1). Clusters which are not accessible to the current user receive the access right ACCESS_FIELD=(0,0). Next, the FAT, DISK_SPACE_TABLE, and CLUSTER_TABLE are constructed based on the access map. When the FAT is being constructed, the real/virtual program converts the real cluster values into virtual values. A flow chart of this program is shown in FIG. 6. This program uses the virtual disk space formation procedure shown in FIG. 3 and described above. This program also converts the values of the deStartCluster fields for all the opened DirEntry on the disk 34 and for the corresponding DirEntry in the FILEDEF_LIST. After the data structures of the HDPS 20 have been constructed, the size field in the loading sector of the logical drive is corrected to the proper number of sectors for the logical drive. Because of disk space occupied by the files of other users and by the HDPS data structures, the volume of disk space available to the current user will be less than the space available when the system 20 was installed.

If the user in the current session is the same user from the previous session, then the formation of HDPS data structures is not required. DISK_SPACE_TABLE and ACCESS_MAP are copied from the HiddenZone to the RAM of the first memory 66 of the PPSM 22.

After initialization of the service data of the protection programs, the address of the entry point to the disk-request handler of INT 13H BIOS in the interrupt processing vector table is changed to the address of the keysprogram 56 of the disk-request handler 46. The address of the original disk-request handler of INT 13H BIOS is retained in the EPROM of the first memory 66 of the PPSM 22 and is used later as the disk-request handler.

The initial key program 52 returns control to the POST procedure, at which time the PPSM 22 is switched to the active mode. Thus, the system 20 is already protected when loading of the operating system 28 begins.

After the initialization program 44 has been executed, all requests for disk operations are sent to the HDPS disk-request handler 46, via the link 40 to the protection software 24, as shown in FIG. 1.

In particular, when a disk request is made, control is transferred to the key program 56 of the HDPS disk-request handler 46. Upon execution of the key program 56 of the HDPS disk-request handler 44, the PPSM 22 is switched to the passive mode. After the PPSM 22 is switched to the passive mode, the key program 56 calls the HDPS disk-request handler 46.

Figure 7:
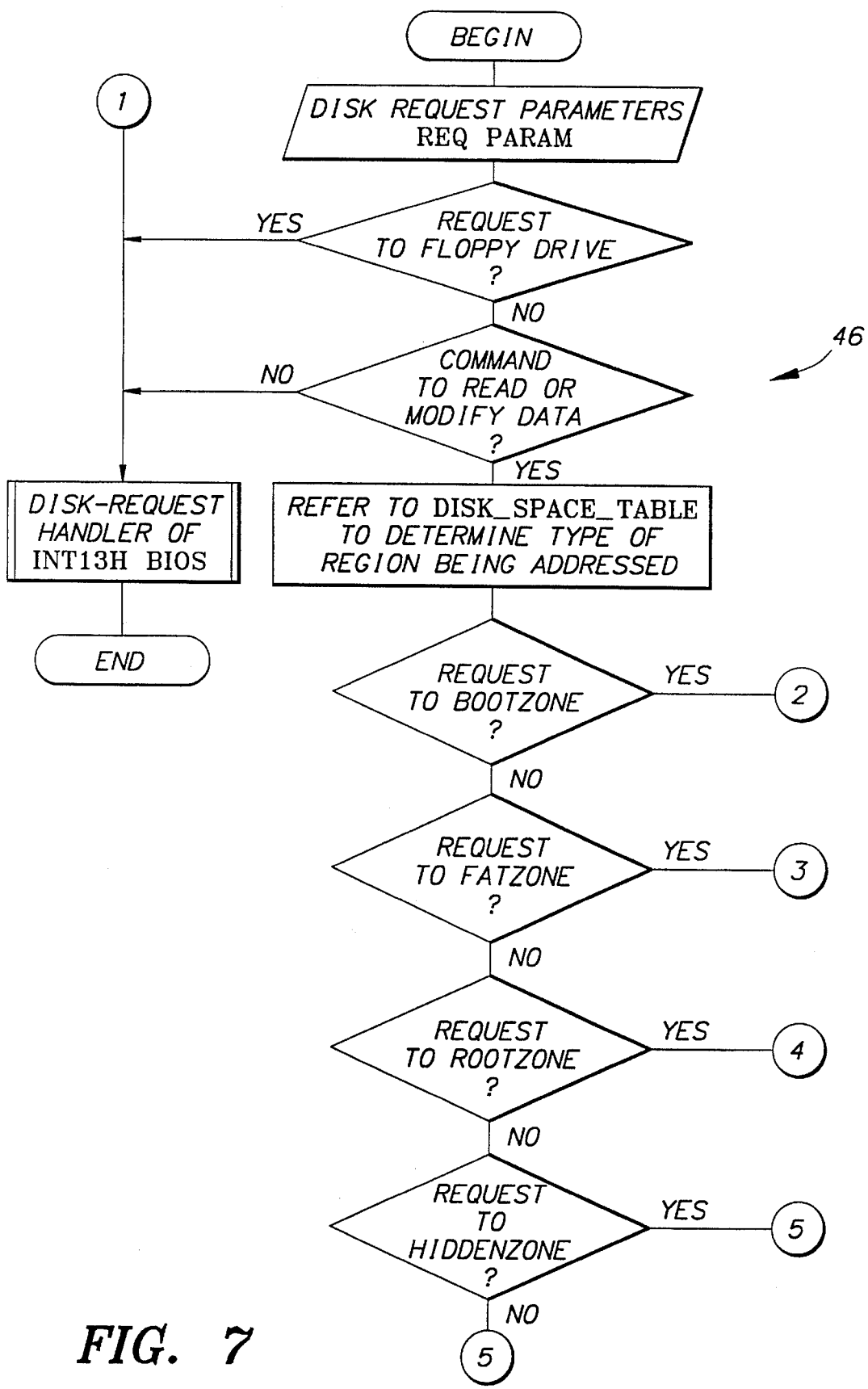
FIGS. 7–7E is a flow chart of the disk-request handler.
Figure 7A:
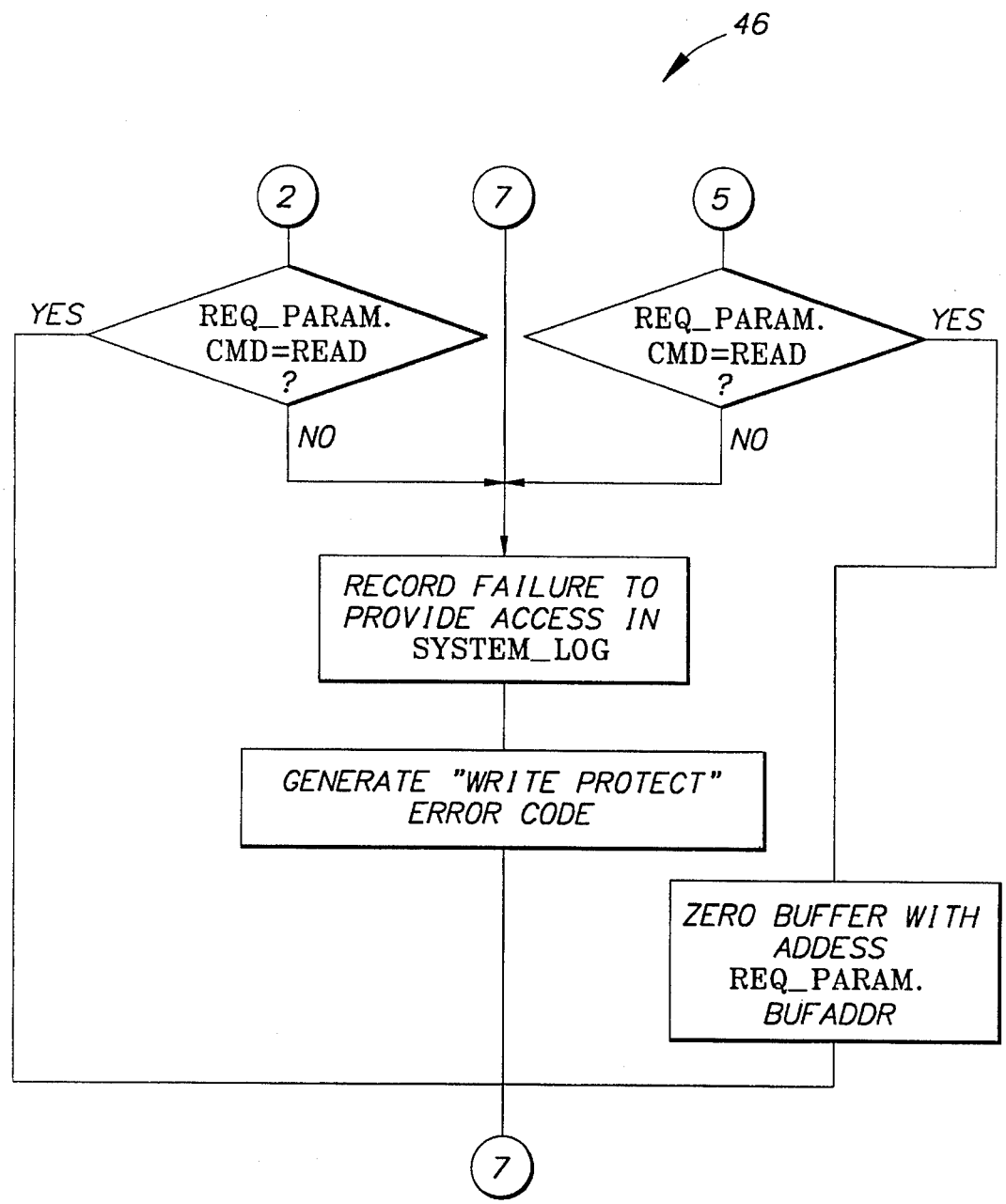
Figure 7B:
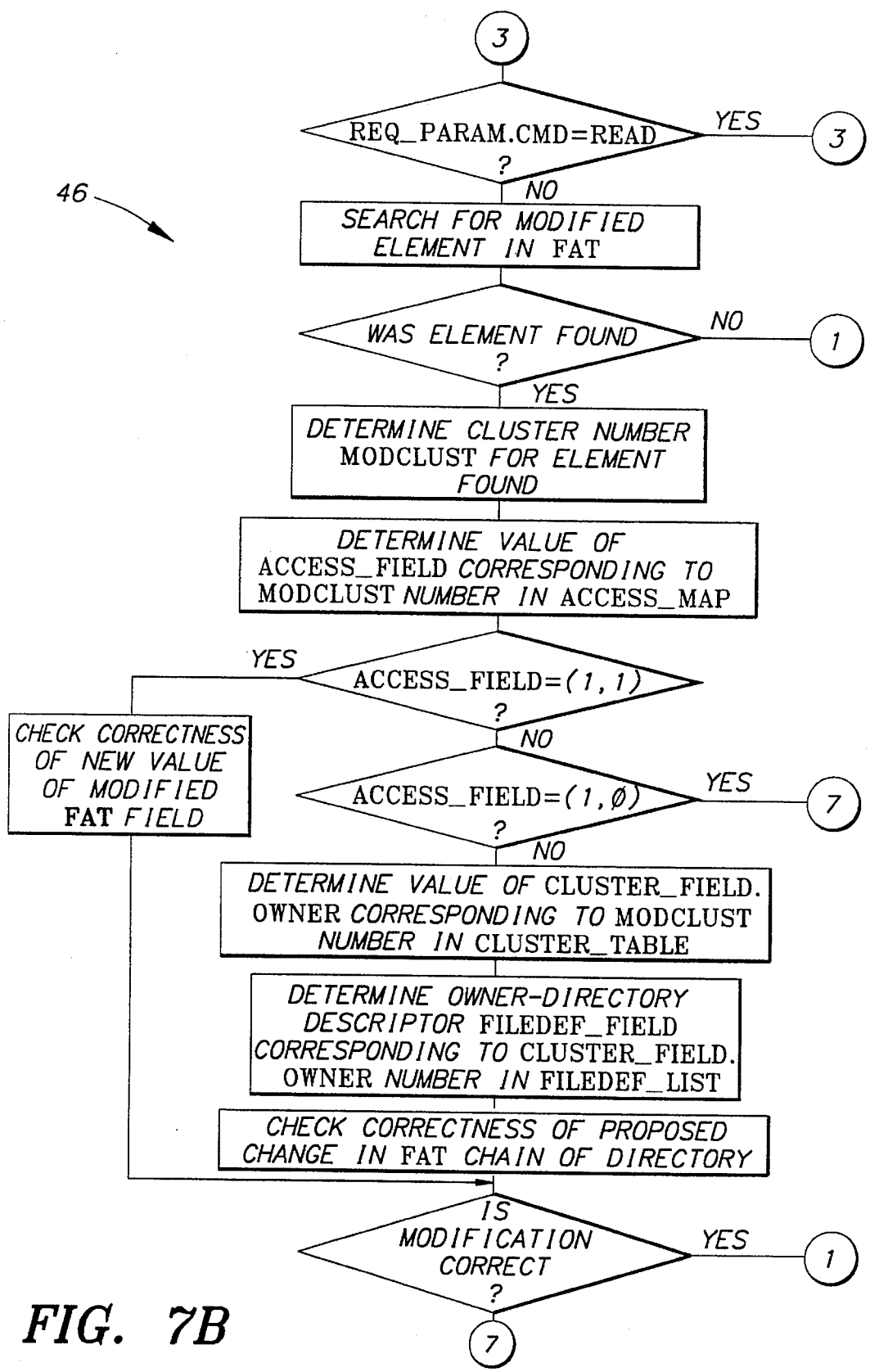
Figure 7C:
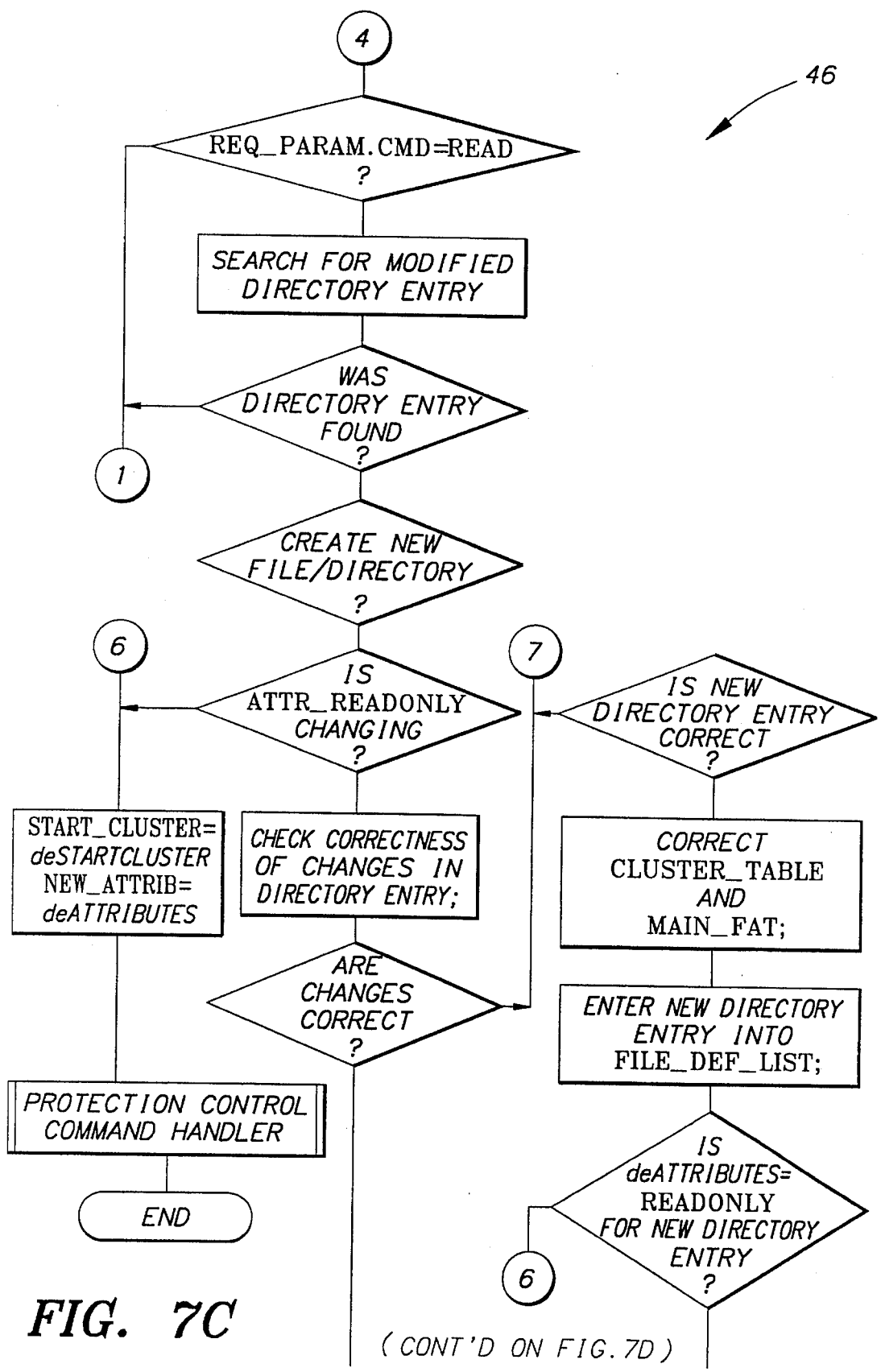
Figure 7D:
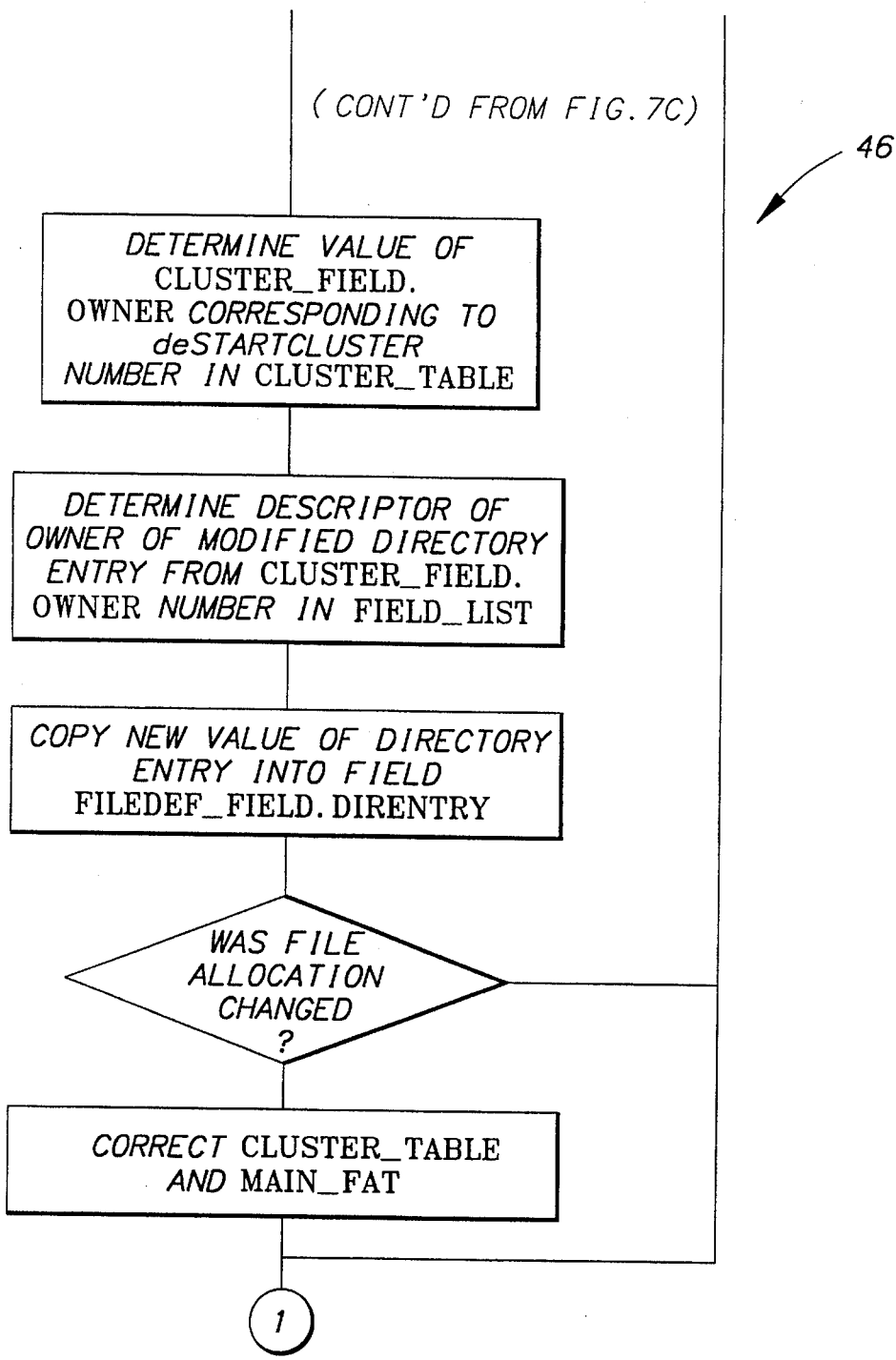
Figure 7E:
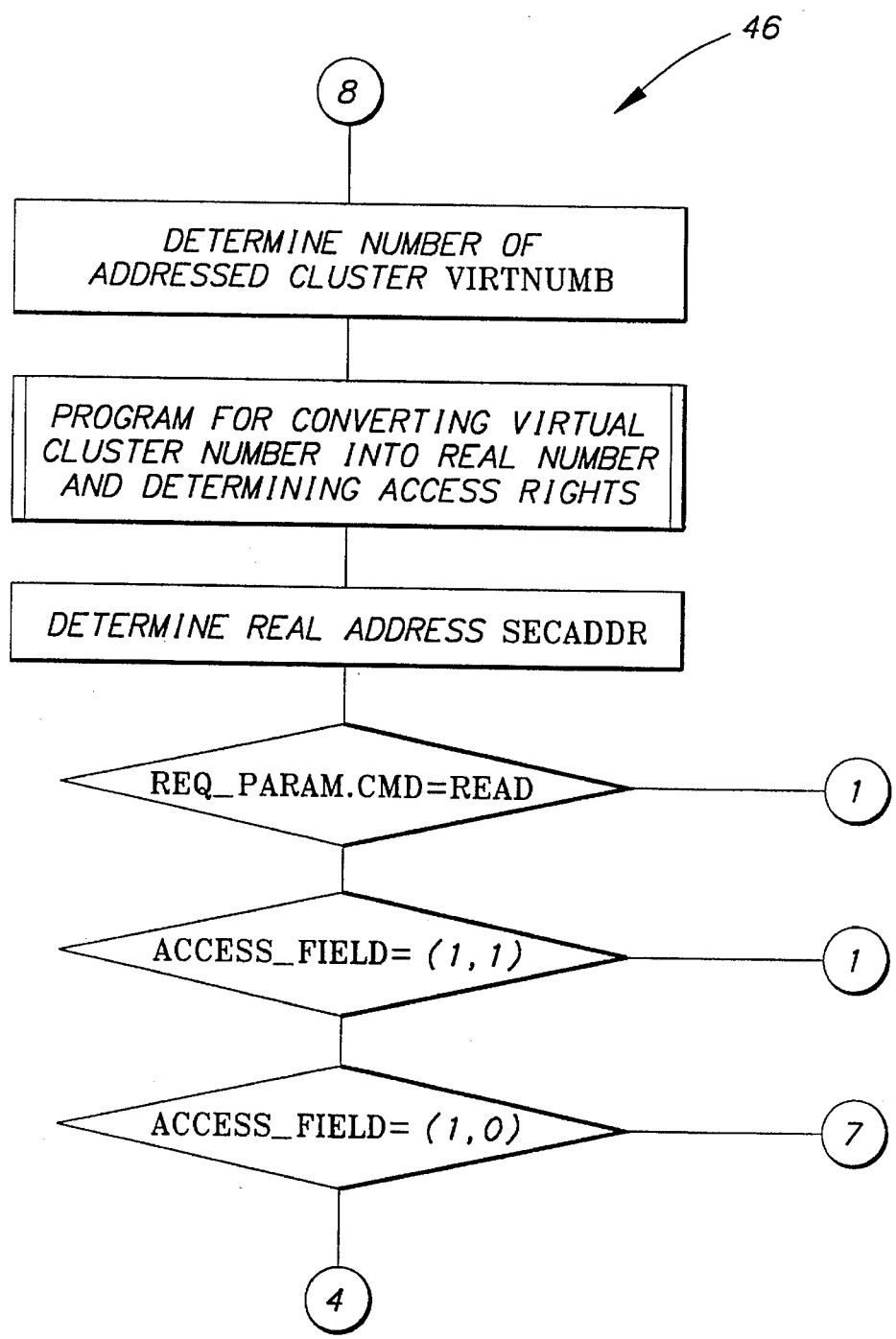

Since the HDPS 20 operates only with the hard disk 34, requests addressed to a floppy disk are not processed by the system 20, but are sent to the original disk-request handler 38 of INT 13H BIOS. Similarly, requests containing the command REQ_PARAM.Cmd=CONTR are not processed by the system. As shown in FIG. 7, requests to read/alter data on the disk 34 are sent to the input of the block which uses the DISK_SPACE_TABLE to determine the type of the disk-space zone being addressed.

We now examine the operation of the disk request program for each logical-drive zone for which there is a request with REQ_PARAM parameters.

A command to read from the Bootzone does not involve the HDPS 20 and is sent to the original disk-request handler of INT 13H BIOS for processing. If REQ_PARAM.Cmd=MODIF, a refusal to service the request is issued. The reason for the refusal is entered in SYSTEM_LOG, a BIOS error code of 3 ("Write protect") is generated, and control is returned to the key program 56 of the HDPS disk-request handler 46. The key program 56 of the HDPS disk-request handler 46 returns control to the process which called. When control is returned to this process, the PPSM 22 is switched to the active mode. Hereinafter, the term "refusal to service a request" is understood to mean the above-described sequence of actions.

As in the previous case, a command to read from the FatZone (i.e., if REQ_PARAM.Cmd=READ) then the request is sent to the original disk-request handler 38 of INT 13H BIOS. In the case of modifications to data in the FAT a search is begun for the modified element and the correctness of the file field of the element is verified. The cluster number ModClust of the modified cluster is determined, and this number is used to select the value of the ACCESS_FIELD from the ACCESS_MAP.

If ACCESS_FIELD=(1,1), then after the correctness of the new value of the modified FAT field is verified, a decision is made as to the validity of the given request. The term "verify the validity" means the following: first, is the new value a pointer to an occupied cluster (i.e., is there a cross reference) and second, is the new value in the permissible range of cluster values.

If ACCESS_FIELD=(1,0) (i.e., the cluster is for reading only), then a refusal to service is generated.

The third possible value, ACCESS_FIELD=(0,1), indicates that the ModClust cluster belongs to a directory. In this case, the value of CLUSTER_FIELD.Owner in CLUSTER_TABLE is determined based on the ModClust number, and then the value of CLUSTER_FIELD Owner is used to select a descriptor of the owner-directory FILEDEF_FIELD in the FILEDEF_LIST. Then, the correctness of the new value of the modified FAT field belonging to the directory is verified. This verification procedure differs from the procedure for verifying the correctness of the FAT file field in that there is an increase in the number of clusters in the directory. This verification is needed because there is no value for deFileSize in the DirEntry of the directory. If directory FAT chain is found to have increased in size, then the corresponding changes are made in CLUSTER TABLE.

If the verifications of the element corrections are successfully completed, then all the changes to the FAT are permissible and the request is transmitted to the original disk-request handler of INT 13H BIOS.

In case of a file modification of a sector from the RootZone, a search is made for the directory entry to be modified. When this entry is found, it is analyzed to determined if a new file/directory is being created or if the directory entry of an existing file/directory is being corrected. If an existing directory entry is being corrected, then a verification is made to determine if changes are being made only in the ATTR_READONLY attribute or if changes do not involve this attribute. If the ATTR_READONLY attribute is being changed, then the protection control command processing program is called. Otherwise, the correctness of the proposed changes in the directory entry is analyzed. This analysis includes checking whether the deStartCluster field has a cross reference and is within the range of permissible cluster values accessible to the user. If the analysis is favorable, then the CLUSTER_FIELD.Owner field is defined by the value of deStartCluster and is used to find the FILEDEF_FIELD descriptor of the owner of the modified directory entry. Then the new value of the directory entry is copied to the DirEntry field of the FILEDEF_FIELD descriptor. When parameters pertaining to file allocation on the disk are changed, corresponding corrections are made in the CLUSTER_TABLE and the MAIN_FAT.

If a new correct directory entry is created, the structures of the CLUSTER_TABLE and MAIN_FAT are corrected in accordance with the value of deStartCluster and the corresponding chain in the FAT. The new value of the directory entry is entered into FILEDEF_LIST. If the file being created has ATTR_READONLY=1, then in addition the protection control command processing program is called.

Figure 8:
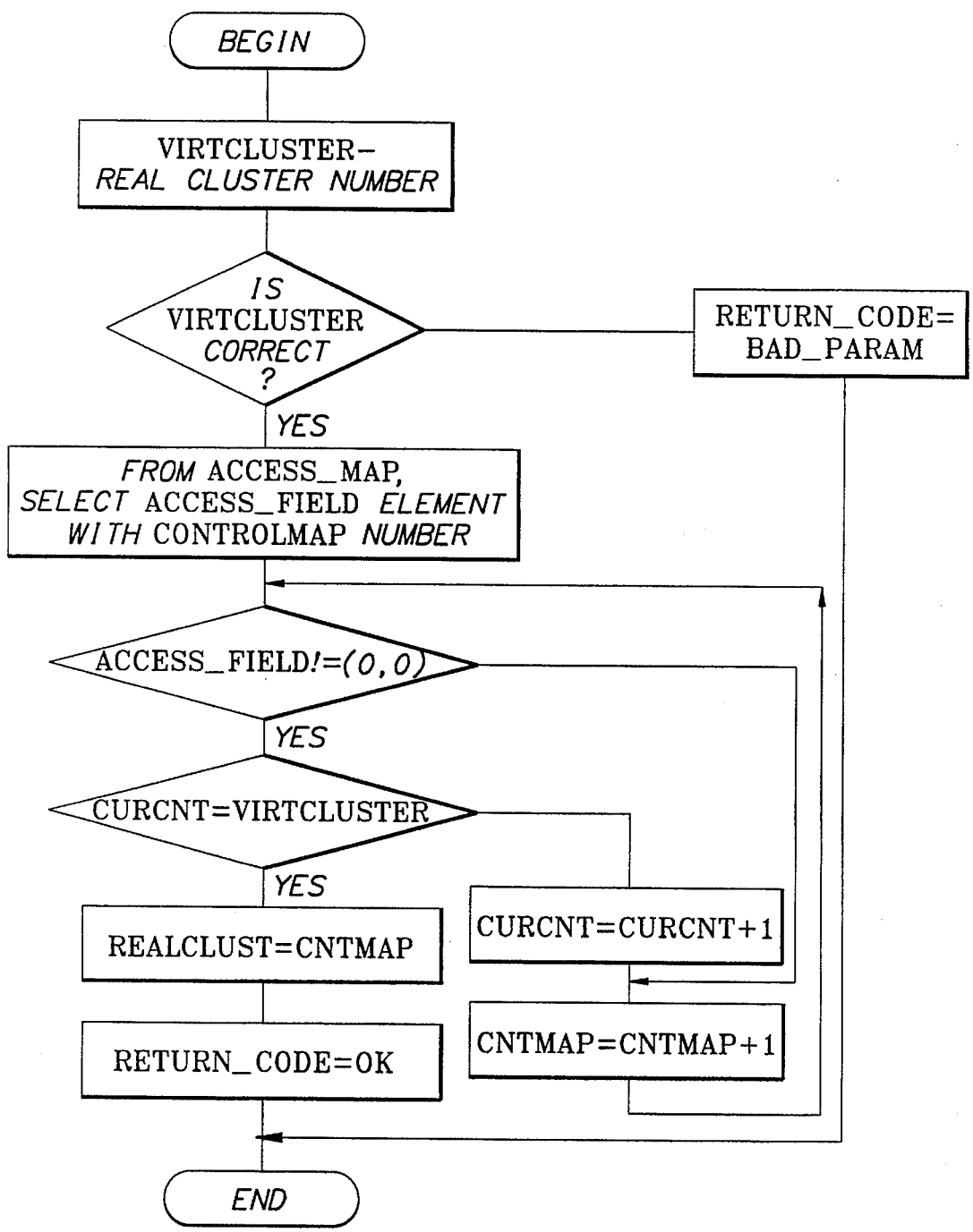
FIG. 8 flow chart of the program which converts a virtual cluster number into a real cluster number.

With regard to requests from the ClustZone, the request address REQ_PARAM.SecAddr is used to determine the virtual cluster number VirtNumb pertaining to the request. The program for converting the virtual cluster number into the real cluster number and for determining the access rights issues the value of the ACCESS_FIELD and the real cluster number RealClust. A block diagram of this program is shown in FIG. 8. Then the new value of SecAddr is calculated based on the real cluster number RealClust. If the request contains a read command or a record command to a cluster with access rights of ACCESS_FIELD=(1,1), then the request with new SecAddr values is sent to the original disk-request handler of INT 13H BIOS. The changes in the cluster belonging to the directory are analyzed in the same way as for the RootZone.

Finally, when an attempt is made to read a hidden service zone (i.e., from the HiddenZone), the user buffer BufAddr is zeroed. This also conceals the contents of the disk region containing HDPS data structures. Any attempt to modify this region is thwarted.

If a disk-operation request pertains to two or more zones of the logical drive, it is divided into requests pertaining to one zone only. These requests are then processed by the algorithm described above.

After control is returned to the disk-request handler from the original disk-request handler of INT 13H BIOS, control is returned to the key program 56 of the disk-request handler 46. The key program 56 then returns control to the program which called it. When control is returned by the key program 56, the PPSM 22 is switched to the active operating mode, in which access is denied to the EPROM and RAM of the first memory 66 and to the hard-disk ports.

The protection control program 50 is stored on the hard disk as an ordinary file of the MS-DOS operating system 28. The control program provides an interface between the user and the HDPS 20 in the execution of the following protection control commands:

registration of a new user, deletion of a user, change of file status change of the attribute of a protected file, change of a user password, and change of a user name.

Figure 9:
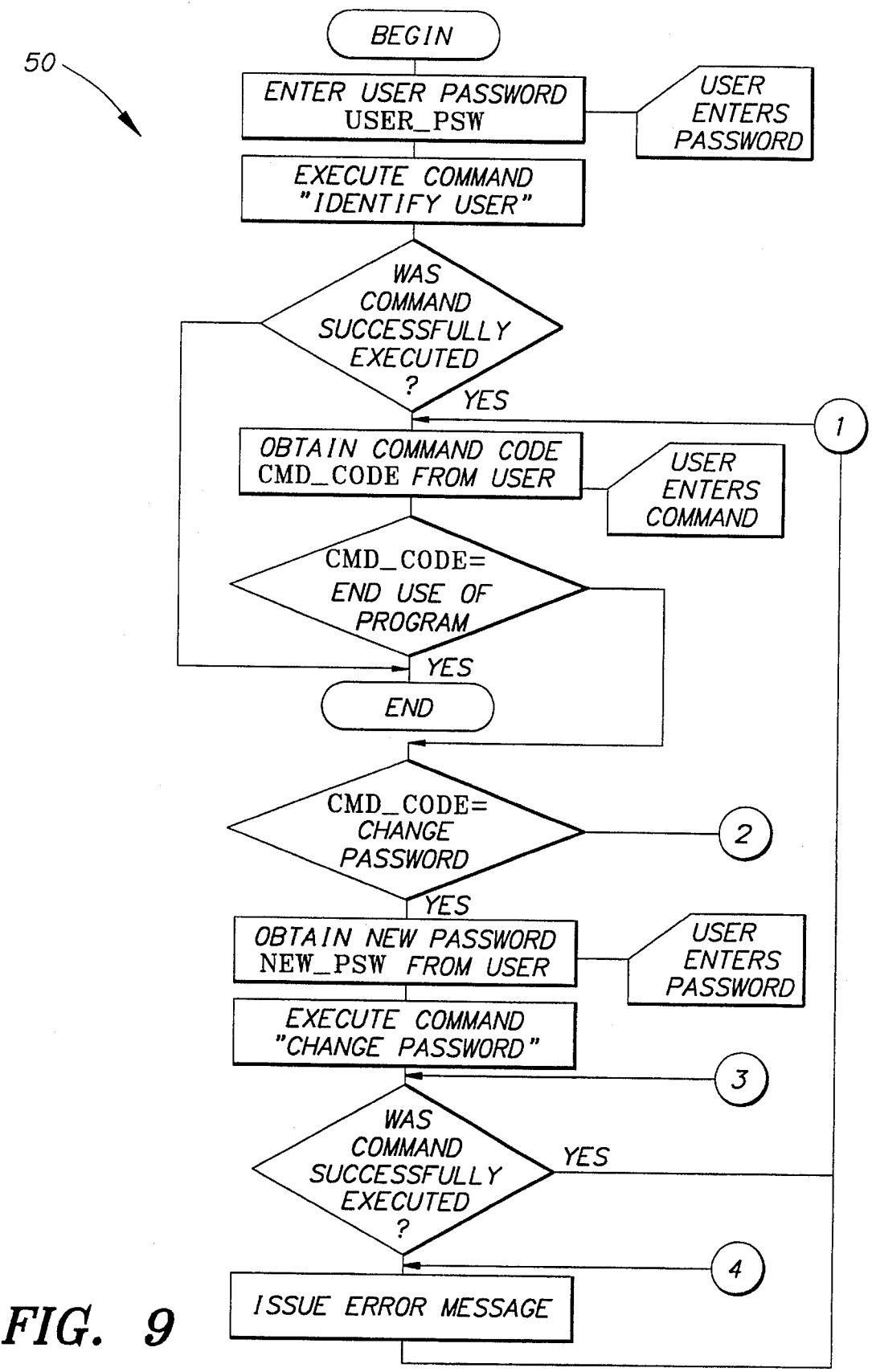
FIGS. 9–9B is a flow chart of the protection control program.
Figure 9A:
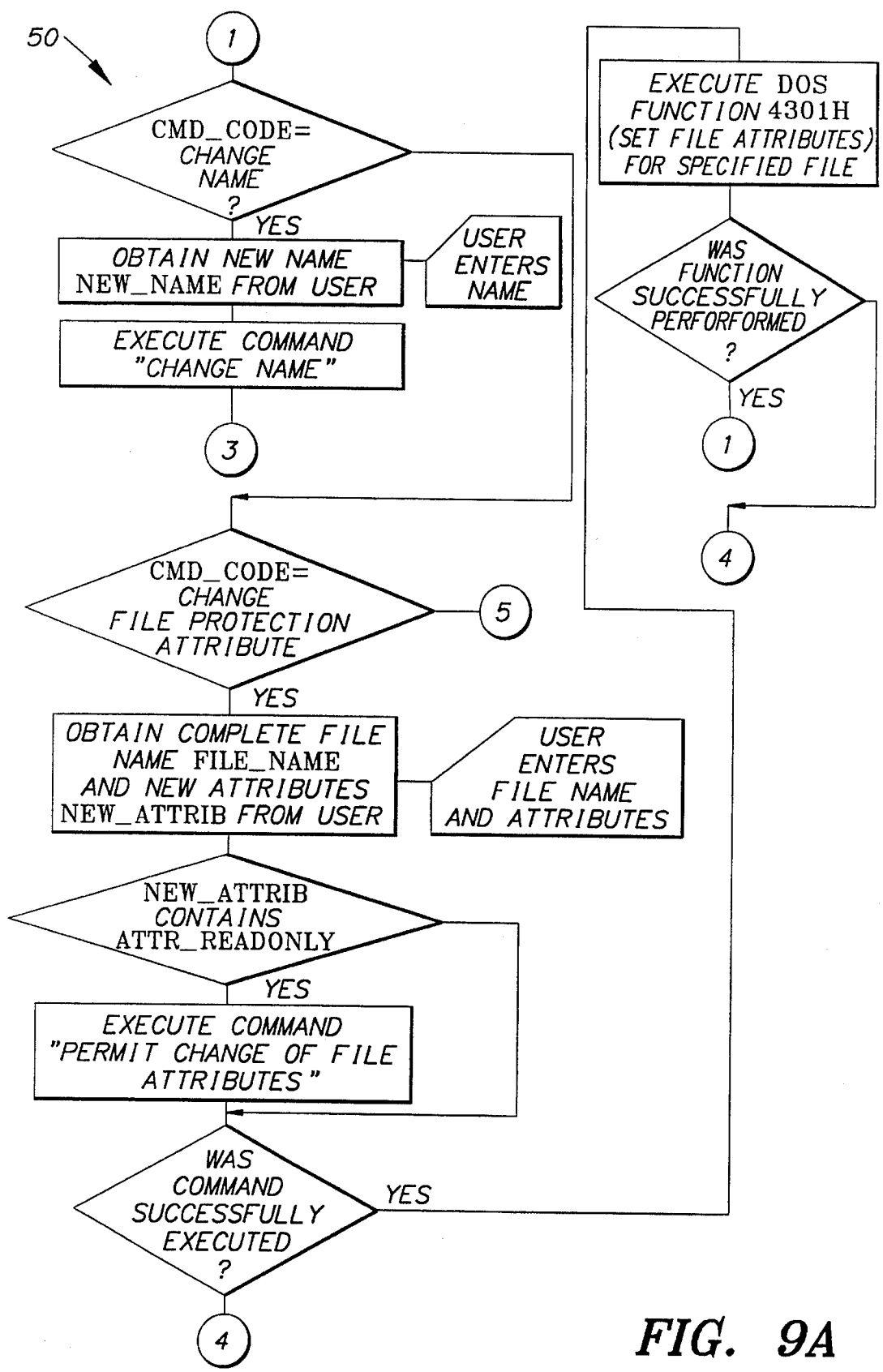
Figure 9B:
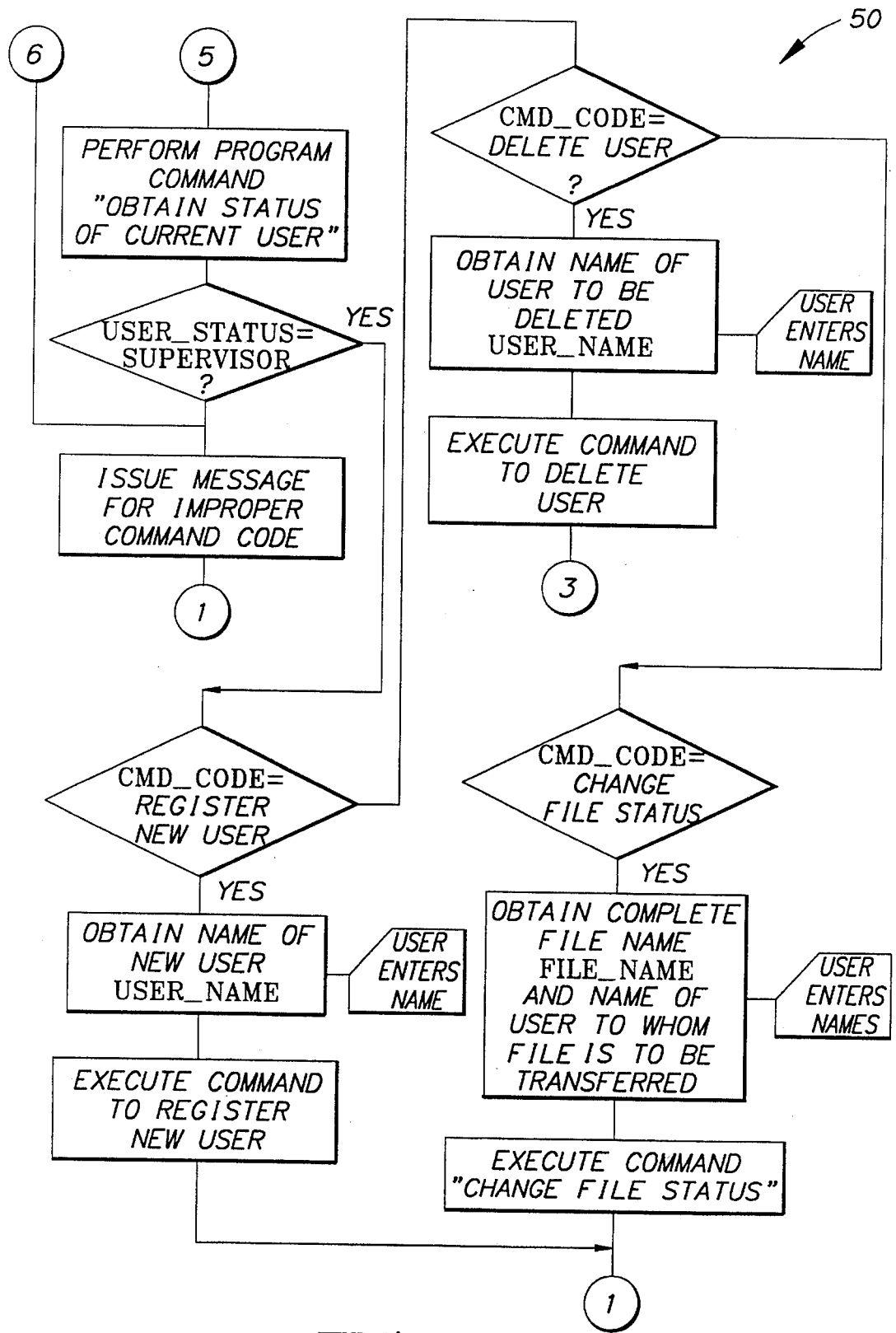

The protection control program 50 is the only application program with the privilege of accessing the HDPS command handler 48. In order to use the privilege of accessing the HDPS command handler 48, the protection control program 50 sets a flag of its own activity when requesting fulfillment of the corresponding command. The granting of this privilege is one of the functions of the HDPS 20. A block diagram of the protection control program 50 is shown in FIGS. 9–9B.

Access to the HDPS command handler 48 is made by a call of the key program 54 of the protection control command handler 48. When the key program 54 of the protection control command handler 48 is executed, the PPSM 20 is switched to the passive mode and the protection control command handler 48 is called.

Figure 10:
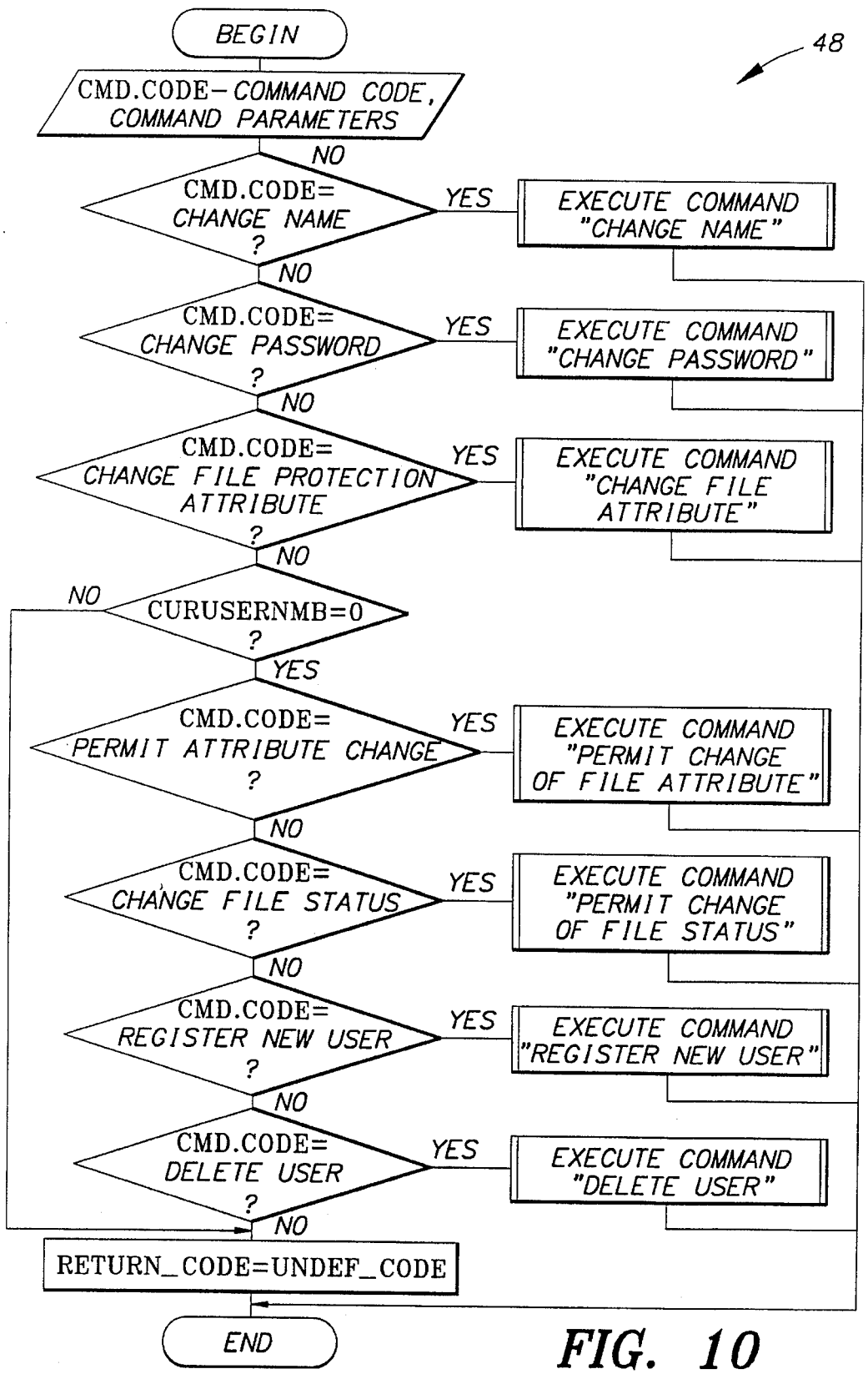
FIG. 10 is a flow chart of the protection control command handler.

The protection control command handler 48 checks the access privilege of the calling program by comparing the code of the incoming command with the protection control command set, which is unique to each HDPS 20. If the code of the incoming command does not match the current protection control command set, then the command is not executed, the system log records an attempt at unsanctioned access to the command handler 48, an error code is generated in the corresponding registers, and control is returned to the key program 54. If the code of the incoming command matches the current protection control command set, then the activity of the protection control program 50 is verified individually for each protection control command. If the activity of the protection control program 50 is confirmed, then the requested protection control command is executed. After the execution of the requested protection control command, control returns to the key program 54 of the protection control command handler, upon which the PPSM 20 is switched to the active operating mode. When this occurs, the command completion code and the parameters returned by it are transmitted to the corresponding registers. If the incoming command pertains to the registration of a new user, the deletion of a user, or a change in file status, then an additional check is made to determine whether the current user has the privilege to execute these commands. If the current user is not the supervisor, then the command is not executed, the system log records an attempt at unsanctioned access to the command handler, an error code is generated in the corresponding registers, and control is returned to the key program 54 of the protection control command handler 48. A block diagram of the protection control command handler 48 is shown in FIG. 10.

Figure 11:
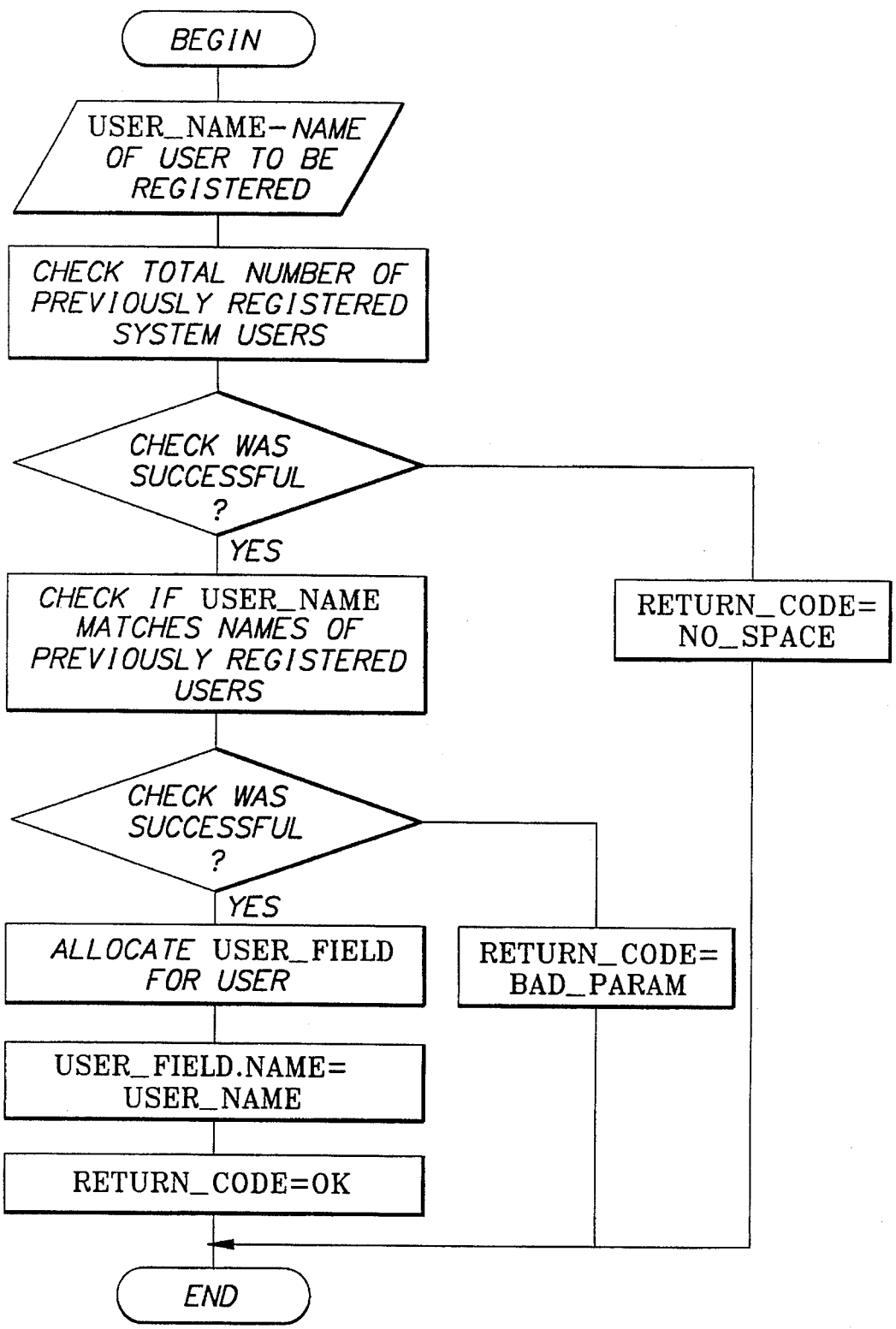
FIG. 11 is a flow chart of the program for processing the command to register a new user.

To execute the new user registration command, the name of the new user is transmitted to the protection control command handler 48. Before the registration command is executed, the total number of registered system users is checked. If the number of registered users is not equal to the maximum number of users, the new name is compared with the list of registered users. If the name does not match any of the names on USER_LIST, then a new USER_FIELD descriptor is added and the UserName field of the descriptor is initialized with the name of the new user. The UserPassword field of the new descriptor is filled when the newly registered user first uses the HDPS 20. If the new name matches a previously registered name or if the number of previously registered users is equal to the maximum, then USER_LIST is not modified, then control returns to the key program 54 of the protection control command handler 48 and an error code is generated. The algorithm for processing a new user registration command is shown in FIG. 11.

Figure 12:
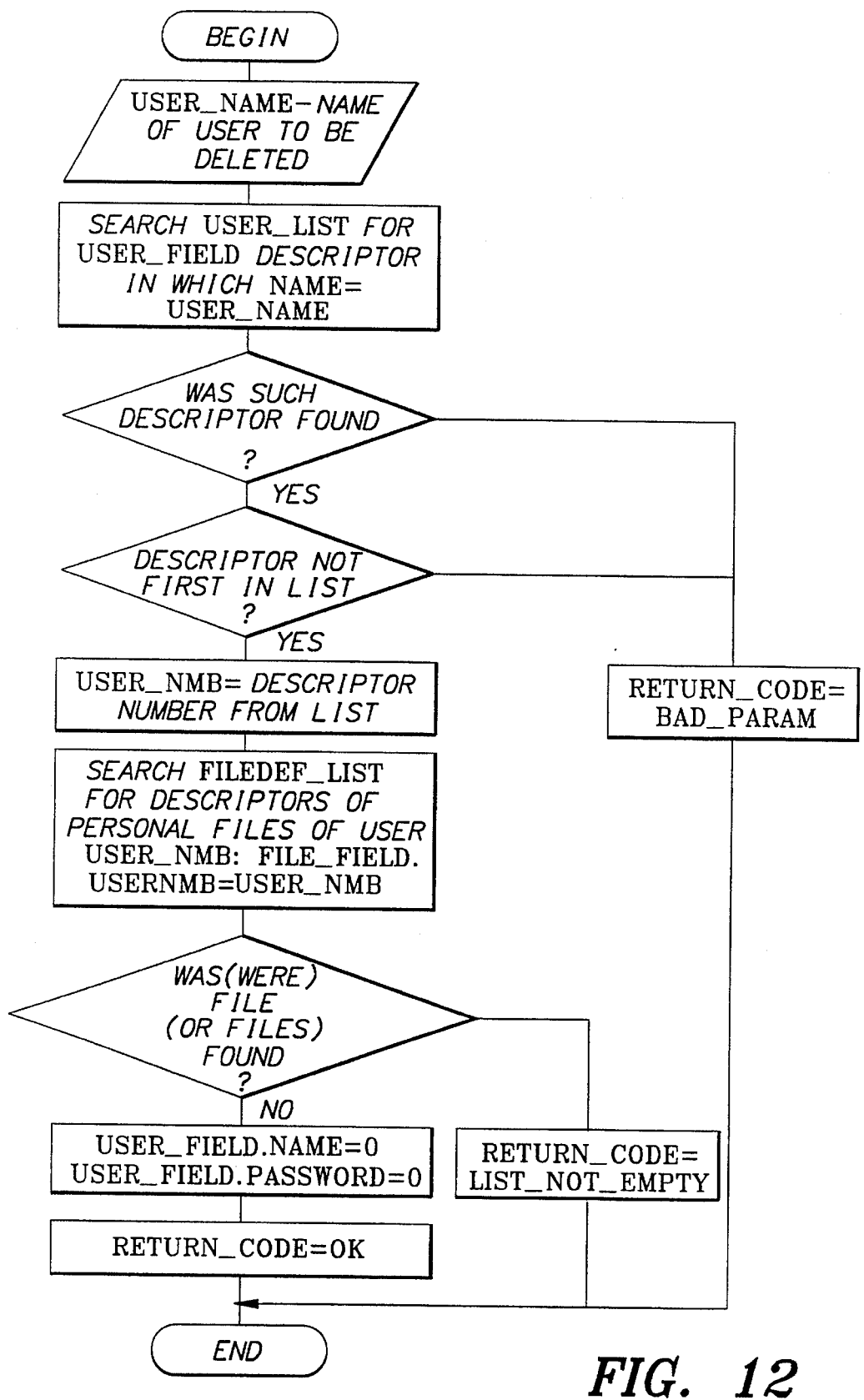
FIG. 12 is a flow chart of the program for processing the command to delete a user.

To execute a delete user command, the user name to be deleted is sent to the protection control command handler 48. The handler program 48 searches USER_LIST for a descriptor with the UserName field that matches the name. If such a descriptor is found and if it is not the first on the list, the handler program 48 searches the directory and file descriptors FILEDEF_FIELD in which the UserNmb field matches the serial number of the descriptor for the user to be deleted. If no such files or directories are found in FILEDEF LIST, then the UserName and UserPassword fields of the user descriptor are zeroed, the flag for successful execution of the command is set, and control returns to the key program 56. If no descriptor with the given name is found on the list, or if the descriptor with the given name is the first on the list (an attempt to delete the supervisor), or if FILEDEF_LIST contains descriptors with the UserNmb field corresponding to the number of the user to be deleted, then an error code is generated and control returns to the key program 54 of the protection control command handler 48. The algorithm for processing a delete user command is shown in FIG. 12.

Figure 13:
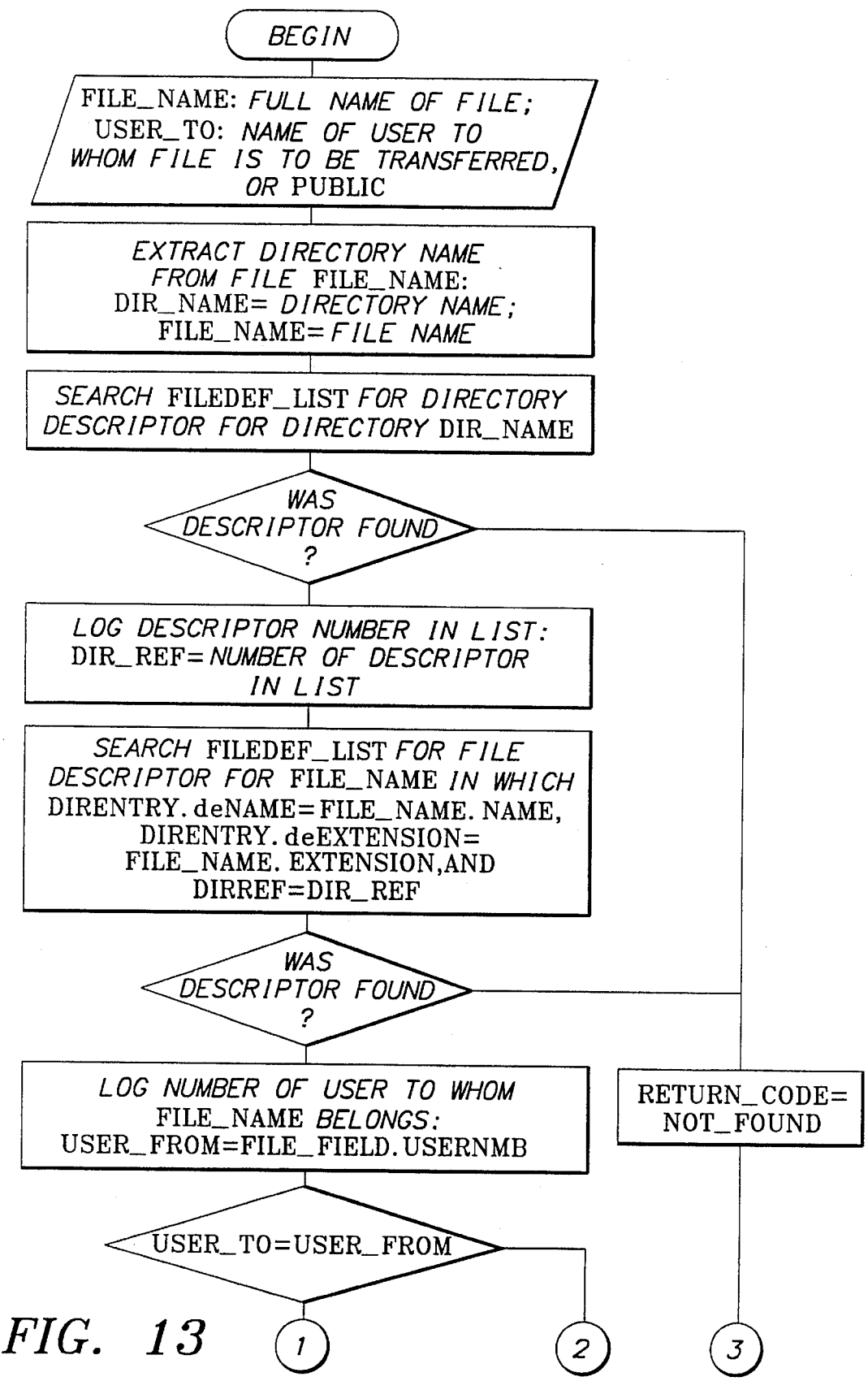
FIGS. 13–13B is a flow chart of the program for processing the command to change the status of a file.
Figure 13A:
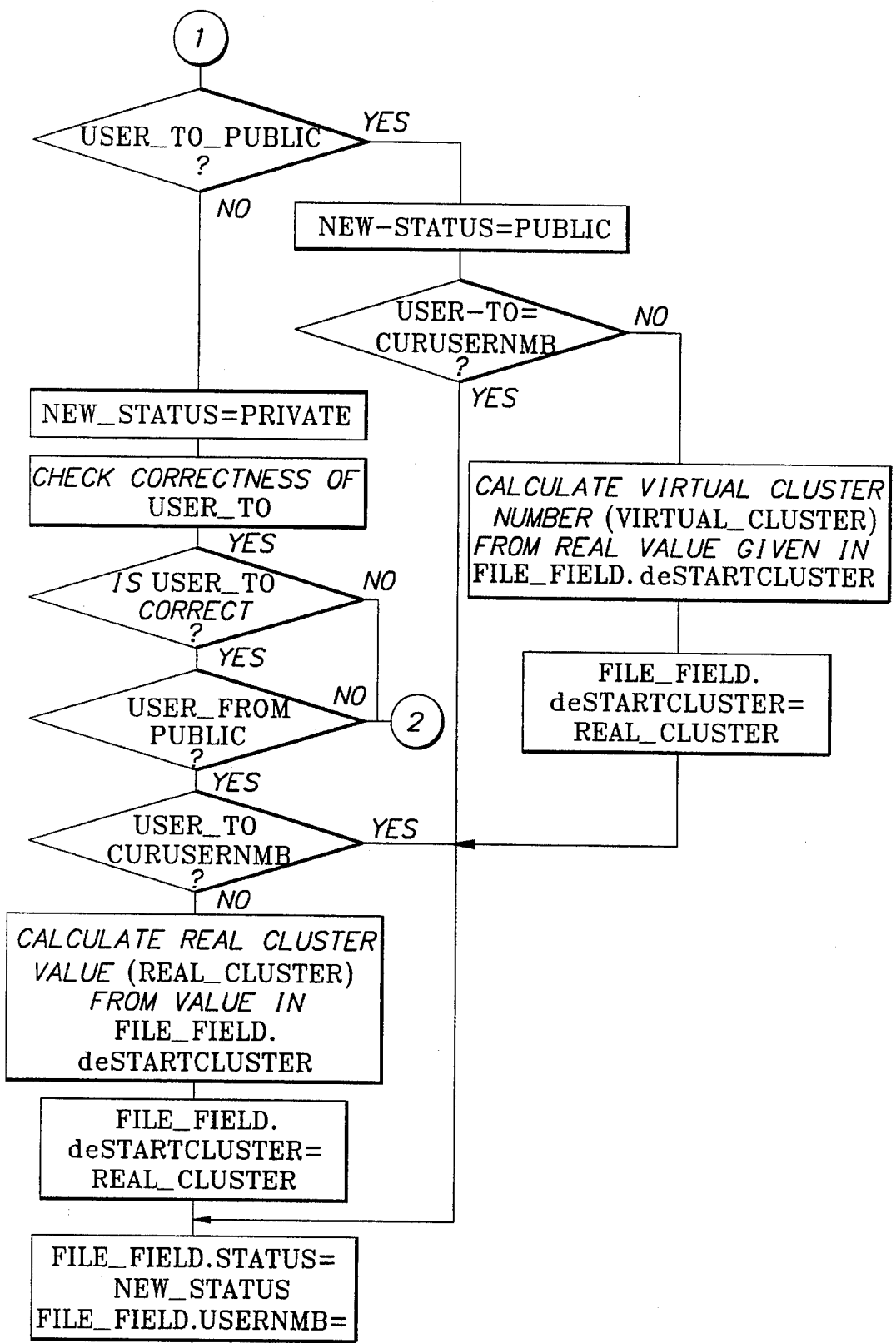
Figure 13B:
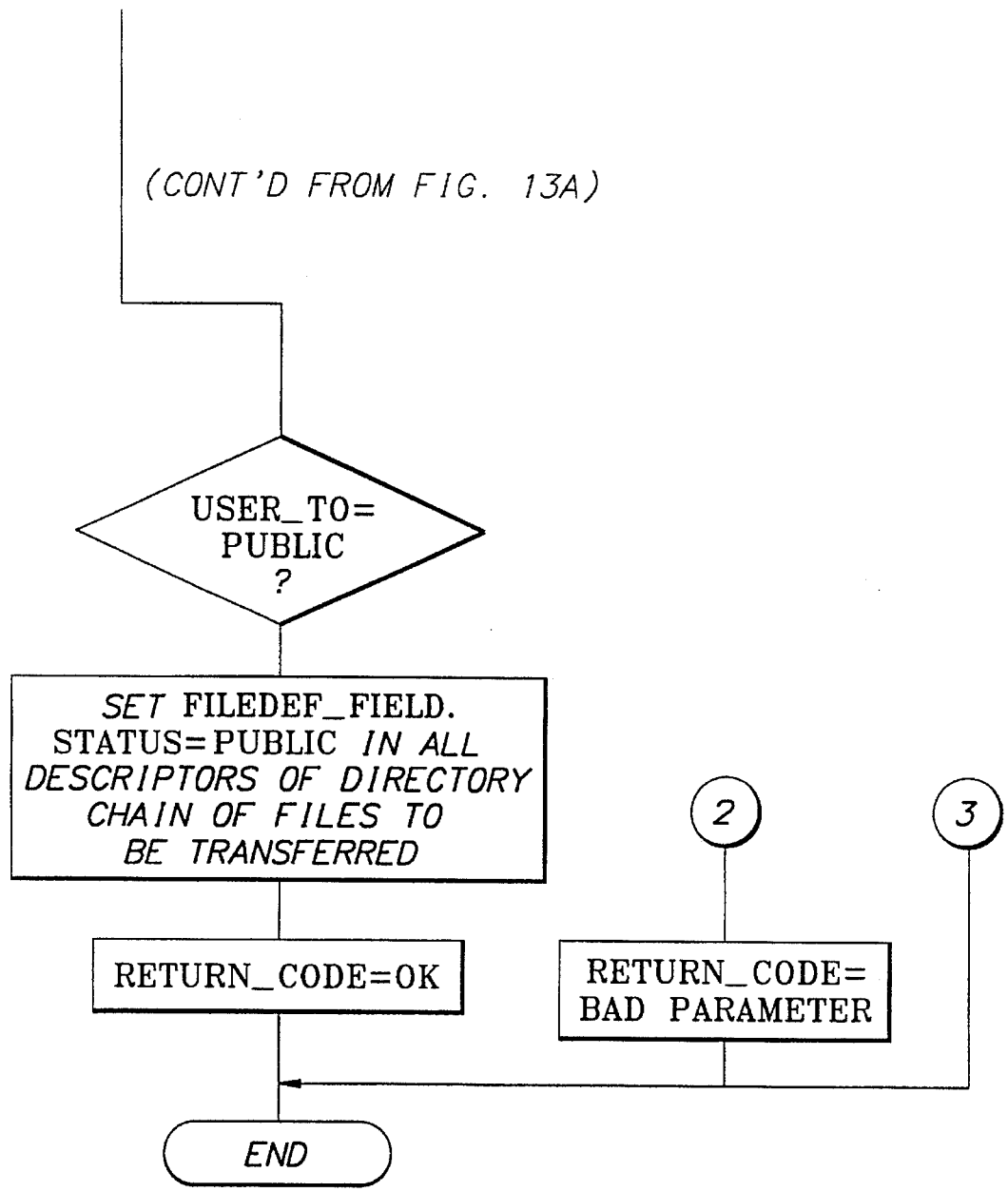

To execute a change file status command, the protection control command handler 48 receives the name of user with which the given file is to be associated and the complete name of the file, including the file name, file extension, and the complete directory path. The user name can be the reserved word PUBLIC, which indicates that the file status is to be changed to openly accessible. If the user name sent to the handler 48 is the name of a registered user then the USER_FIELD element number for that user in the USER_LIST is stored in the variable USER_TO. To execute the change file status command, the handler 48 extracts the complete directory path of the file and searches FILEDEF_LIST for a directory descriptor FILEDEF_FIELD corresponding to each directory name. If the descriptor for any one of the directory names is not found on the list, then an error code is generated and control returns to the key program 54. If descriptors are found for all the directory names of the path, then the number in the descriptor list of the last directory name from the path is stored in the DIR_REF variable. After the value of DIR_REF has been set, the handler 48 searches FILEDEF_LIST for the FILE-DEF_FIELD file descriptor for which the deName and deExtension fields match the name and extension of the given file and for which the DirRef field matches the value of the DIR_REF variable. If no descriptor with these values is found, then an error code is generated and control returns to the key program 54. If a descriptor with these values is found, then the value of the UserNmb field of this file descriptor is stored in the USER_FROM variable. If the value of the USER_FROM variable matches the value of the USER_TO variable, then an error code is generated and control returns to the key program. If the values do not match and if the value of the USER_TO variable is equal to PUBLIC and the value of the USER_FROM variable matches the number of the current user descriptor CurUserNmb, then the value PUBLIC is ascribed co the Status and UserNmb fields of the file descriptor, the flag for successful execution of the command is set, and control returns to the key program 54. If the value of the USER_TO variable is equal to PUBLIC and the value of the USER_FROM variable matches the number of the USER FIELD descriptor of any registered user, the UserNmb and Status fields of the file descriptor are given the value PUBLIC, and the real cluster value in the deStartCluster file descriptor is changed to the virtual value for the current disk-space distribution, the flag for successful execution of the command is set, and control returns to the key program 54 of the protection control command handler 48. If the value of the USER_TO variable equals CurUserNmb and the USER_FROM variable equals PUBLIC, then the Status field of the file descriptor is given the value PRIVATE, the value of the USER_TO variable is ascribed to the UserNmb field of the file descriptor, the flag for successful execution of the command is set, and control returns to the key program. If the value of the USER_TO variable corresponds to the number of the USER_FIELD descriptor of any registered user and the value of the USER_FROM variable is equal to PUBLIC, then the Status field of the file descriptor is given the value PRIVATE, the value of the USER_TO variable is ascribed to the UserNmb field of the file descriptor, the virtual cluster value in the deStartCluster file descriptor for the current disk-space distribution is changed to the real cluster value the flag for successful execution of the command is set, and control returns to the key program 54 of the protection control command handler 48. The algorithm for processing a change file status command is shown in FIG. 13.

Figure 14:
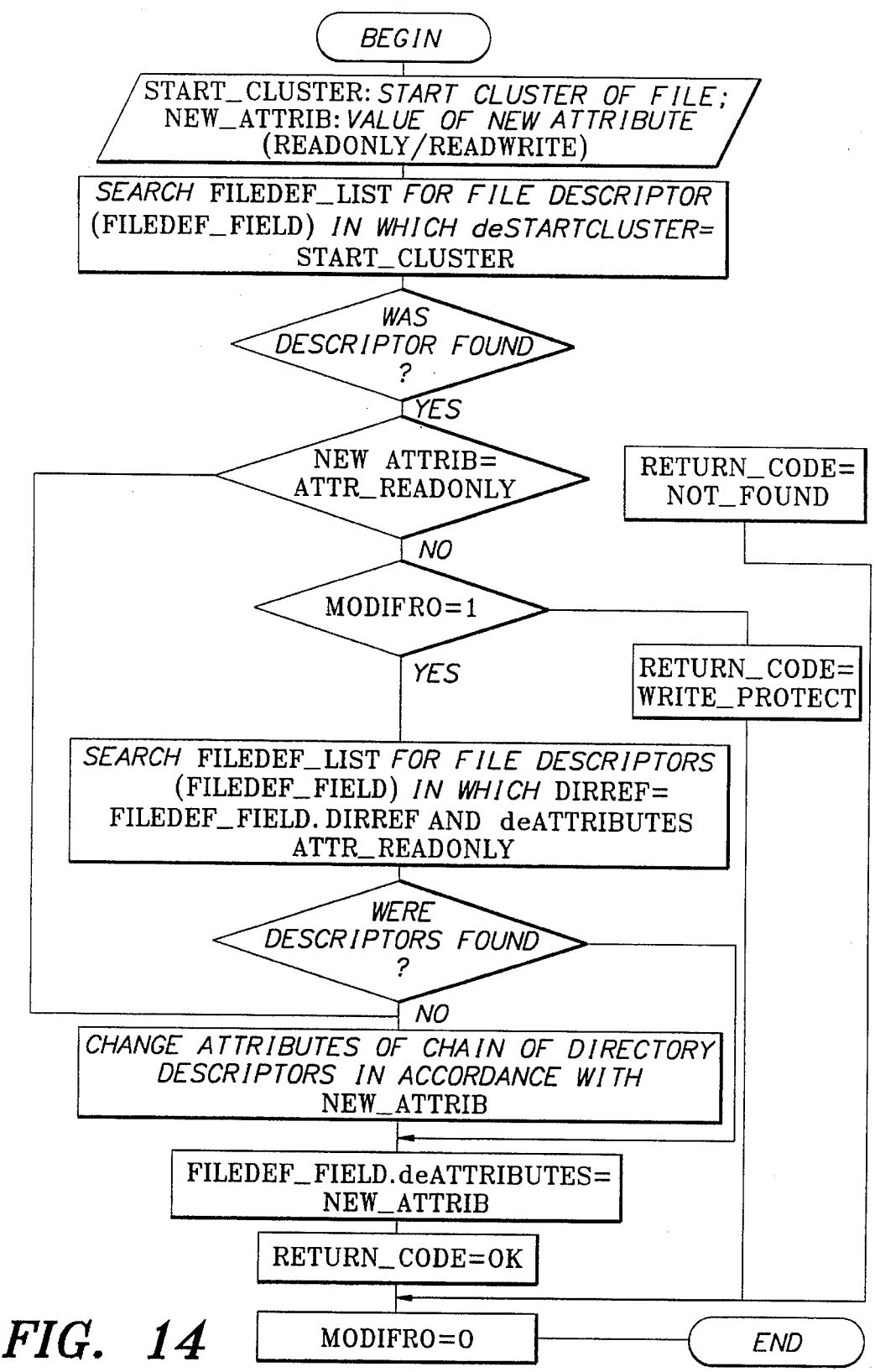
FIG. 14 is a flow chart of the program for processing the command to change the protection attribute of a file.

To execute a change file protection attribute command, the starting cluster of the file an the value of the proposed attribute change are sent to the protection control command handler 48. The handler searches FILEDEF_LIST for a FILEDEF_FIELD file descriptor in which the value of the deStartCluster field matches the value of tile given starting cluster. If no such descriptor is found, then an error code is generated and control transfers to the key program 54. If a descriptor matching these parameters is found in the list, then the proposed attribute is checked. If the proposed attribute is not ATTR_READONLY, then the state of the ModifRO variable is checked. If the value of the ModifRO variable is not equal to 1, then an error code is generated and control returns to the key program. If the value of the ModifRO variable is equal to 1, then the handler 48 searches FILEDEF_LIST for file descriptors in which the deAttributes field contains ATTR_READONLY. If no file descriptor with these values is found in the list, then the value ATTR_READONLY is set in the deAttributes field of the directory descriptor which has a number corresponding to the DirRef field of the descriptor of the specified file. Then the process of searching for file descriptors with the specified values and of modifying the directory descriptor is repeated for a search value equal to the value of the DirRef field of the directory descriptor, and an iterative search is made of all the higher-level directories up to the root directory. If a file descriptor is found with a deAttributes field containing the value ATTR_READONLY, the modification process is stopped. After the chain of directory descriptors has been modified, then the value ATTR REA-DONLY is set in the deAttributes field of the given file, the flag for successful execution of the command is set, and control returns to the key program 54. If the proposed attribute corresponds to ATTR_READONLY, the chain of directory descriptors is modified by giving the deAttributes fields of the descriptors the value ATTR_READONLY. After the chain of directory descriptors has been modified, then the value ATTR_READONLY is given to the deAttributes field of the specified file the flag for successful execution of the command is set, and control returns to the key program 54 of the protection control command handler 48. The algorithm for processing a change file protection attribute command is shown in FIG. 14.

Figure 15:
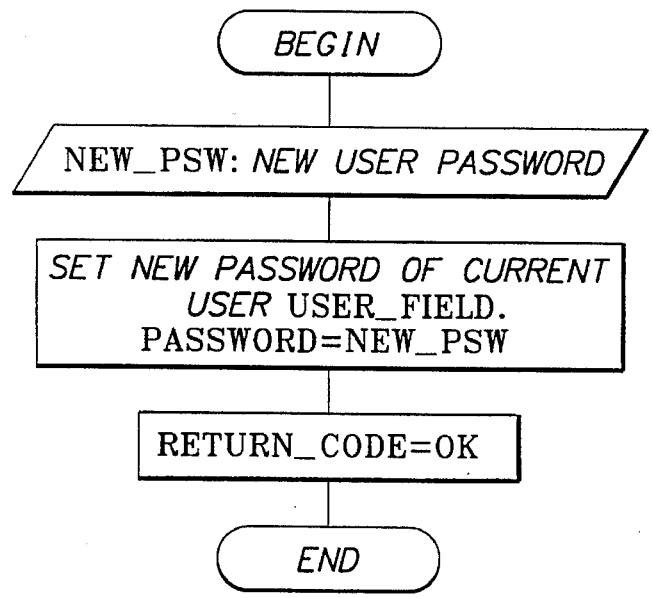
FIG. 15 is a flow chart of the program for processing the command to change a user password.

To execute a change user password command, the new password is sent to the protection control command handler 48. The specified value is entered in the UserPassword field of the name and password descriptor of the corresponding current user, the flag for successful execution of the command is set, and control returns to the key program of the protection control command handler 48. The algorithm for processing a change user password command is shown in FIG. 15.

Figure 16:
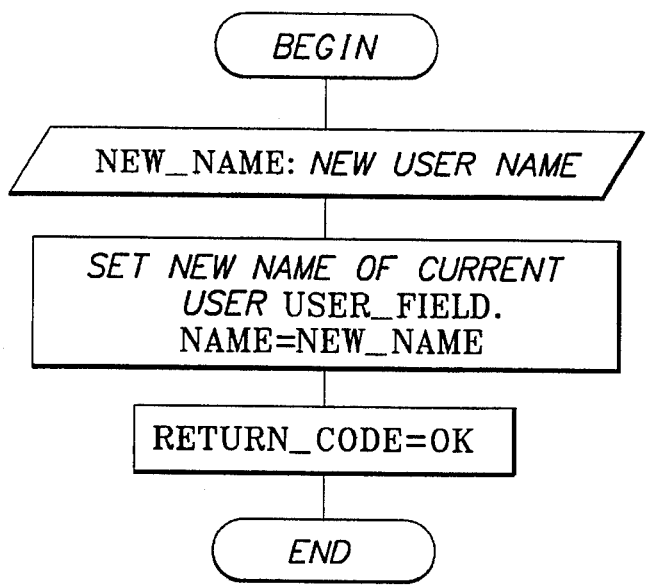
FIG. 16 is a flow chart of the program for processing the command to change a user name.
Figure 17:
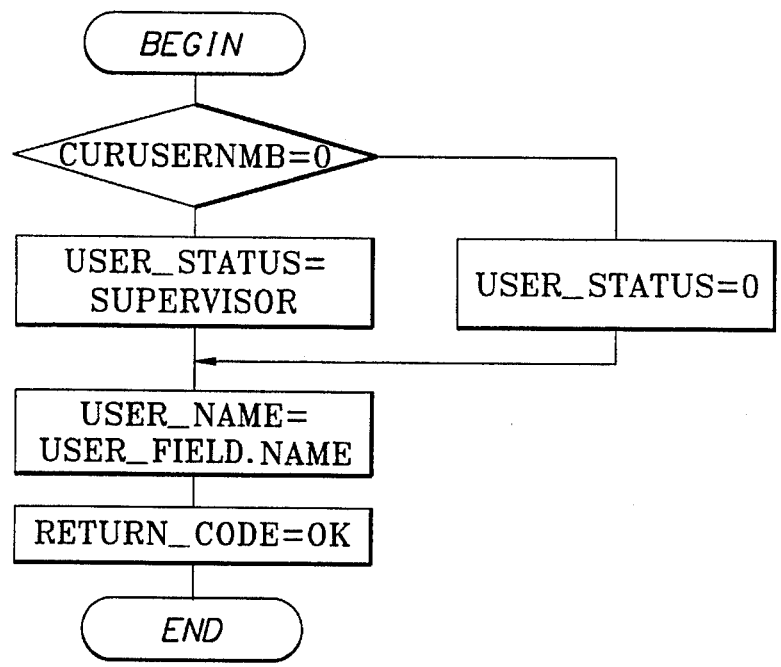
FIG. 17 is a flow chart of the program for processing the command to obtain the user's status.
Figure 18:
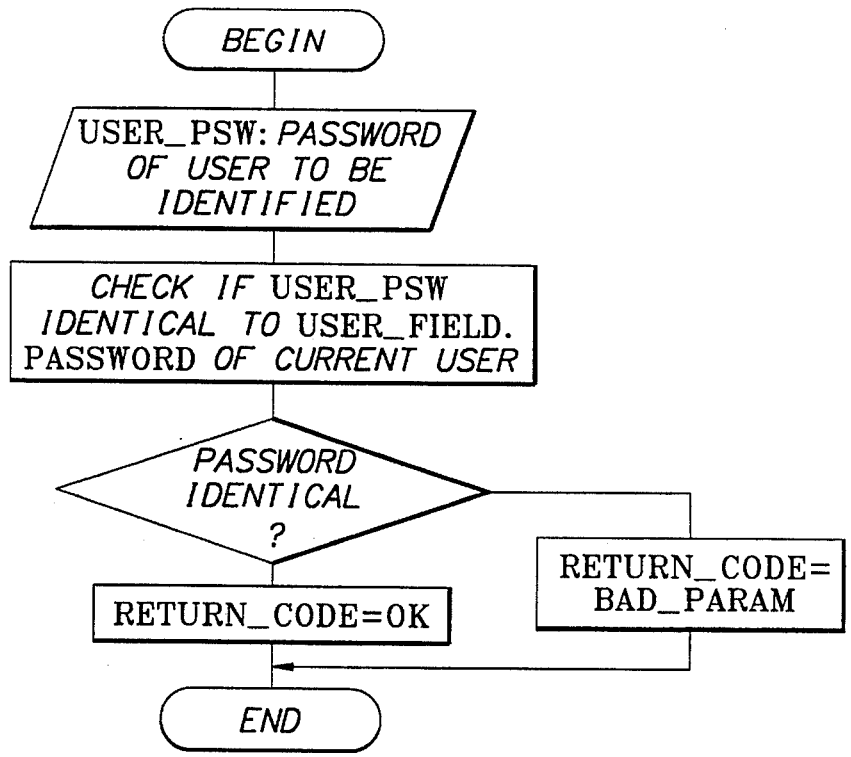
FIG. 18 is a flow chart of the program for processing the command to identify the user.
Figure 19:
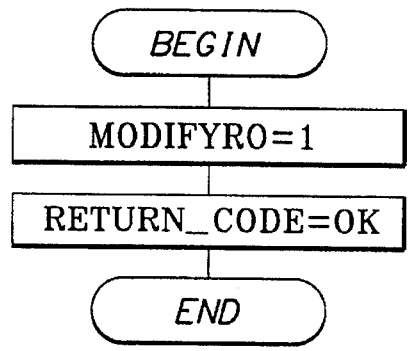
FIG. 19 is a flow chart of the program for processing the command to permit a change in a file attribute.
Figure 20:
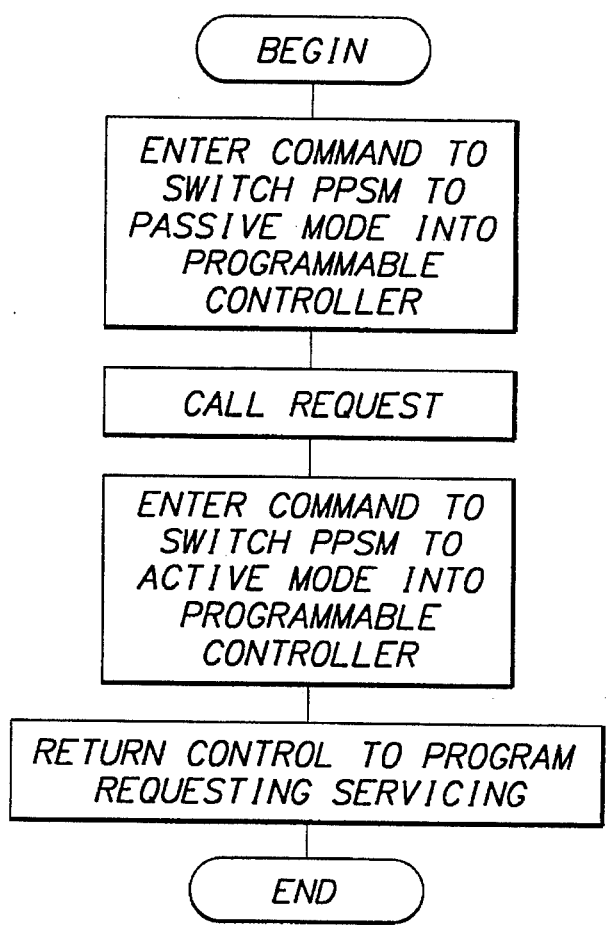
FIG. 20 is a flow chart for a key program.

To execute a change user name command, the new name is sent to the protection control command handler 48. The specified value is entered in the UserName field of the name and password descriptor of the corresponding current user, the flag for successful execution of the command is set, and control returns to the key program 54 of the protection control command handler 48. The algorithm for processing a change user name command is shown in FIG. 16.

Without further elaboration, the foregoing will so fully illustrate my invention that others may, by applying current or future knowledge, readily adopt the same for use under various conditions of service.

APPENDIX
LIST OF ABBREVIATIONS AND TERMS

GENERAL TERMS:

| | |
|---|---|
| HDPS | Hard Disk Protection System |
| POST | Power On Self Test; |
| ROM-Scan | A BIOS procedure which scans the memory region in which the BIOS of the computer peripheral devices is to be installed; |
| EPROM | electrically programmable read-only memory; |
| RAM | random-access memory; |
| HD | hard disk; |
| Logical Drive | A partitioned region of a hard disk (for the MS-DOS operating system) |
| FAT | File Allocation Table; |
| Root Catalog | The region of an MS-DOS logical drive in which the top-most directory is stored; |
| Loading Sector | The first sector of an MS-DOS logical drive, which contains information about the drive; |
| ATTR_READONLY | A file attribute which forbids the use of the write operation on the contents of a given file (MS-DOS operating system); |
| Request Address | Parameters which are transmitted to the INT13H BIOS disk-request handler and which include the numbers of the disk, the track, the surface, and the sector; |
| MODIF | Commands which are transmitted to the INT13H BIOS disk-request handler and which causes the execution of write or formatting operations; |
| READ | A command which is transmitted to the INT13H BIOS disk-request handler and which causes the execution of the read operation; and |
| CONTR | A set of control commands which are transmitted to the INT13H BIOS disk-request handler and which cause the execution of operations such as positioning, storage reset, etc. but not the operations of writing, formatting, or reading. |

VARIABLE NAMES:

| | |
|---|---|
| SupName | Variable which stores the supervisor name; |
| SupPassword | Variable which stores the supervisor password; |
| CurUserNmb | Variable which stores the current user number; |
| REQ_PARAM | Data structure which is transmitted to the disk-request handler and which has the following format: |
| SecAddr: | the sector address |
| Cmd: | the code of the requested operation(READ, MODIF, CONTR) |
| BufAddr: | the exchange buffer address |
| ModClust | Variable which stores the number of the modified cluster in the FAT; |
| VirtCluster | Variable which stores the virtual number of the cluster; |
| RealCluster | Variable which stores the real number of the cluster; |
| USER_TO | Variable which stores the name of the user with whom a particular file is to be associated; |
| USER_FROM | Variable which stores the name of the user with whom a particular file is associated; |
| ModifRO | Variable which stores the flag of permission to modify the file-protection attribute; |
| USER_PSW | Variable which stores the user password during the execution of protection control commands; |
| CMD_CODE | Variable which stores the code of the protection control command; |
| NEW_PSW | Variable which stores the new user password when the password is being changed; |
| NEW_NAME | Variable which stores the new user name when the name is being changed; |

| APPENDIX LIST OF ABBREVIATIONS AND TERMS | |
|---|---|
| FILE_NAME | Variable which stores the complete file name during the execution of protection control commands; |
| USER_STATUS | Variable which stores the status of the current user; |
| USER_NAME | Variable which stores the name of the current user; |
| USER_NMB | Variable which stores the number of the current user; |
| RETURN_CODE | Variable which stores the completion code of the protection control command; |
| DIR_NAME | Variable which stores the directory name during the execution of protection control commands; |
| NEW_STATUS | Variable which stores the file status during the execution of protection control commands; |
| START_CLUSTER | Variable which stores the start cluster of a file; and |
| NEW_ATTRIB | Variable which stores the file attribute during the execution of protection control commands. |

We claim:

1. A hard disk protection system for protecting data of a plurality of users stored on a hard disk of a personal computer, the hard disk having logical disk structure having sector access rules including an operating system having logical drives, said system comprising:

protection programs that generate a respective access map for each user to map each logical drive into a corresponding adjustable virtual zone, said adjustable virtual zone permitting each user to modify the sector access rules for the user's data, and a hardware module, responsive to said protection programs, that either allow or deny access to the hard disk based on said modified sector access rules, said hardware module having a first memory that is inaccessible to the central processing unit and a second memory that is accessible to the central processing unit.

2. The system of claim 1 wherein the computer further comprises a power-on self test and an INT13H handler and wherein said protection programs comprise:

a protection initialization program for creating said access map upon start-up or reset of the computer, said protection initialization program receiving control from a power-on self test via an initial key program;

a disk request handler program for analyzing disk requests before the INT13H handler can process the disk requests, said disk request handler program being entered via a disk request handler key program;

a protection control program for providing an interface between the particular user and said system; and a protection control command handler for checking incoming commands from said protection control program via a protection control command handler key program.

3. The system of claim 2 wherein said protection initialization program comprises:

means for verifying a user name and a user password;

means for generating service data for each user for determining said adjustable virtual zones;

means for allocating disk space on the hard disk for establishing said adjustable virtual zone for each logical drive; and means for changing the address of the INT 13H BIOS handler in the interrupt vector table.

4. The system of claim 3 wherein said service data comprises a first set of data and a second set of data, said first set of data being unique for each logical drive and being stored at the end of each logical drive on the hard disk and said second set of data being stored in said first memory.

5. The system of claim 4 wherein said first set of data comprises a list of directory and file descriptors, a map of access rights, a disk space partitioning table, a cluster affiliation table, a main file allocation table and a list of disk control and address parameters.

6. The system of claim 5 wherein said second set of data comprises a list of user names and passwords.

7. The system of claim 5 wherein a first one of the fixed zones of the logical disk structure occupies the disk space from the sector containing the description of the logical drive partition to the loading sector of the disk, inclusive, the first zone being monitored and controlled by said disk request handler program for permitting access for reading only of information on the hard disk.

8. The system of claim 5 wherein a second one of the fixed zones of the logical disk structure occupies the disk space from the first sector of the first copy of the logical-drive file allocation table to the first sector of the root directory of the disk, the second zone being monitored and controlled by said disk request handler program for permitting access for reading of, and for making permitted changes to, information on the hard disk.

9. The system of claim 5 wherein a third one of the fixed zones of the logical disk structure occupies the disk space from the first to the last sector of the disk root directory, inclusive, the third zone being monitored and controlled by said disk request handler program for permitting access for reading of, and for making permitted changes to, information on the hard disk.

10. The system of claim 5 wherein a fourth one of the fixed zones of the logical disk structure occupies the disk space at the end of the logical drive, the zone having a beginning location, the fourth zone being monitored and controlled by said disk request handler program for permitting access for reading of, and for making permitted changes to, information on the hard disk.

11. The system of claim 5 wherein said protection programs create a hidden zone for each logical drive, said hidden zone comprising a size that occupies the disk space from the first sector of the first cluster of the disk to the beginning location of said hidden zone that occupies the disk space at the end of the logical drive, said hidden zone being monitored and controlled by said disk request handler for prohibiting any access for reading or writing, said size being determined by said list of directory and file descriptors, said access map, said cluster table and said main file allocation table.

12. The system of claim 2 wherein each of said key programs can switch said hardware module into either a passive mode or an active mode, said passive mode permitting said protection programs to be read without affecting access to the hard disk by the central processing unit, said active mode hiding said protection programs from the central processing unit and denying access to the hard disk, each of said key programs being stored in said second memory and having a corresponding memory address.

13. The system of claim 2 wherein said initial key program receives control from the BIOS ROM Scan procedure.

14. The system of claim 5 wherein said disk request handler program uses said disk space partitioning table to interpret any hard disk request involving reading or altering of information on the hard disk in one of the fixed set of zones.

15. The system of claim 14 wherein said disk request handler program utilizes said map of access rights and said cluster affiliation table for responding to the hard disk request for a particular one of the fixed set of zones.

16. The system of claim 3 wherein said means for changing the address of the INT 13H BIOS handler in the interrupt vector table replaces the address of the original handler of INT 13H BIOS in the interrupt vector table with said corresponding address of said disk request handler key program before the operating system is loaded.

17. The system of claim 2 wherein said protection control command handler key program transfers control from said protection control program to said protection command request handler program.

18. The system of claim 5 wherein said protection control command handler program comprises:
   means for monitoring the access privilege of a calling program;
   means for registering new users;
   means for deleting a user from said system;
   means for changing the status of a file;
   means for changing the file attribute;
   means for changing a user password; and
   means for changing a user name.

19. The system of claim 18 wherein said protection control program is the only program that can access said control-command handler program and thereby provide an interface between the user and said system in the execution of said means for registering new users, said means for deleting a user from said system, said means for changing the status of a file, said means for changing the file attribute, said means for changing a user password or said means for changing a user name.

20. The system of claim 2 wherein said protection control program is stored on the hard disk as an ordinary file.

21. The system of claim 2 wherein said protection initialization program, said disk request handler program and said protection control command handler program are stored in said first memory.

22. The system of claim 11 wherein said first set of data is stored in said hidden zone.

23. The system of claim 22 wherein said means for allocating disk space allocates disk space in said hidden zone, said allocation means creating a region of disk space at the end of each logical drive, said allocation means transferring any user files or user directories in said region to clusters which are accessible to the user.

24. The system of claim 3 wherein said protection initialization program further comprises means for converting the values of the deStartCluster fields from real cluster values to virtual cluster values in constructing said file allocation table and thereby forming said adjustable virtual zones, said adjustable virtual zones being formed by eliminating clusters that do not belong to the current user.

25. The system of claim 22 wherein said protection initialization program further comprises means for transferring said map of access rights and said disk space partitioning table to said first memory from said hidden zone whenever the previous user is identical to the current user.

26. The system of claim 22 wherein said protection initialization program further comprises means for converting the values of deStartCluster fields from virtual cluster numbers to real cluster numbers whenever the current user is different from the previous user.

27. The system of claim 5 wherein said access map is constructed based on the deAttributes of the files of the directories belonging to the current user, and wherein:
   the clusters belonging to files with ATTR_REA-DONLY=0 and unoccupied clusters receive an access right of ACCESS_FIELD=(1,1);
   the clusters belonging to files with ATTR_REA-DONLY=1 receive an access right of ACCESS_FIELD=(1,0);
   the clusters belonging to directories receive an access right of ACCESS_FIELD=(0,1); and
   the clusters which are not accessible to the current user receive an access right of ACCESS_FIELD=(0,0).

28. The system of claim 27 wherein said main file allocation table, said disk space partitioning table and said cluster affiliation table are constructed based on said access map.

29. The system of claim 15 wherein said disk request handler program further comprises means for converting said virtual cluster number into a real cluster number for determining the sector address pertaining to the request.

* * * * *